United States Patent
Imoto

(10) Patent No.: US 8,209,167 B2
(45) Date of Patent: Jun. 26, 2012

(54) MOBILE RADIO TERMINAL, SPEECH CONVERSION METHOD AND PROGRAM FOR THE SAME

(75) Inventor: Kazunori Imoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 891 days.

(21) Appl. No.: 12/212,158

(22) Filed: Sep. 17, 2008

(65) Prior Publication Data

US 2009/0083038 A1      Mar. 26, 2009

(30) Foreign Application Priority Data

Sep. 21, 2007    (JP) ................................ 2007-245968

(51) Int. Cl.
G10L 11/06 (2006.01)
G10L 19/14 (2006.01)
G10L 21/04 (2006.01)
(52) U.S. Cl. ................... 704/214; 704/224; 704/503
(58) Field of Classification Search .................. None
See application file for complete search history.

(56) References Cited

U.S. PATENT DOCUMENTS

| | | | | |
|---|---|---|---|---|
| 5,034,947 A * | 7/1991 | Epps | ................ | 370/268 |
| 6,175,820 B1 * | 1/2001 | Dietz | ................ | 704/235 |
| 6,343,269 B1 * | 1/2002 | Harada et al. | ............... | 704/243 |
| 6,363,343 B1 * | 3/2002 | Horos | ................ | 704/225 |
| 6,615,174 B1 * | 9/2003 | Arslan et al. | ............... | 704/270 |
| 7,082,395 B2 * | 7/2006 | Tosaya et al. | ............... | 704/246 |
| 7,577,564 B2 * | 8/2009 | Wenndt et al. | ............... | 704/203 |
| 7,580,839 B2 * | 8/2009 | Tamura et al. | ............... | 704/258 |
| 7,796,748 B2 * | 9/2010 | Bonnard et al. | .......... | 379/387.02 |
| 7,996,222 B2 * | 8/2011 | Nurminen et al. | ............ | 704/250 |
| 2005/0261905 A1 * | 11/2005 | Pyo et al. | ................ | 704/252 |
| 2006/0004569 A1 * | 1/2006 | Yoshioka et al. | ............. | 704/225 |
| 2006/0167691 A1 * | 7/2006 | Tuli | ................ | 704/258 |
| 2009/0326952 A1 * | 12/2009 | Toda et al. | ............... | 704/270 |

FOREIGN PATENT DOCUMENTS

| | | | |
|---|---|---|---|
| FR | 2761800 A1 * | 10/1998 |
| JP | 9-90993 | 4/1997 |
| JP | 10-254473 | 9/1998 |
| JP | 2001-69200 | 3/2001 |
| JP | 2005-173476 | 6/2005 |
| JP | 3760173 | 1/2006 |

OTHER PUBLICATIONS

Takehiro Moriya, "Speech Coding", ISBN 4-88552-156-4, 1998, pp. 92-190.

* cited by examiner

*Primary Examiner* — Brian Albertalli

(74) *Attorney, Agent, or Firm* — Oblon, Spivak, McClelland, Maier & Neustadt, L.L.P.

(57) ABSTRACT

The mobile radio terminal includes a speech input unit which inputs a speech signal obtained from speech of a speaking person, an estimating unit which estimates a speech style of the speaking person from the speech signal, and a converting unit which converts the speech signal into a converted speech signal in accordance with the estimated speech style.

19 Claims, 21 Drawing Sheets

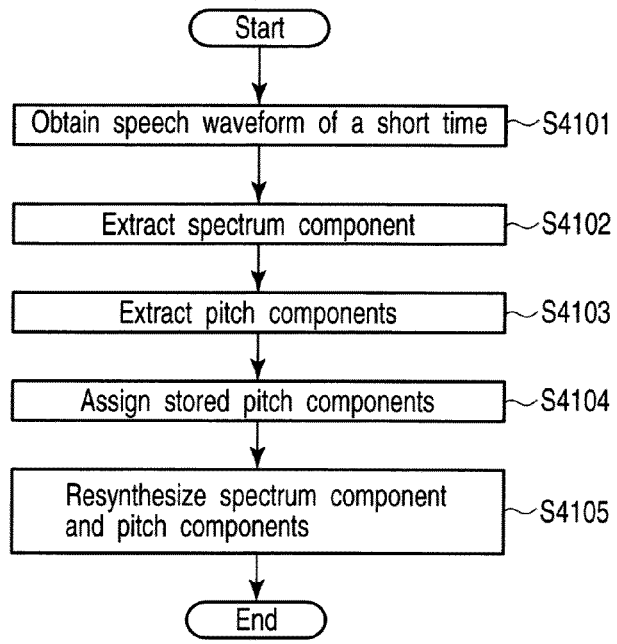
F I G. 7
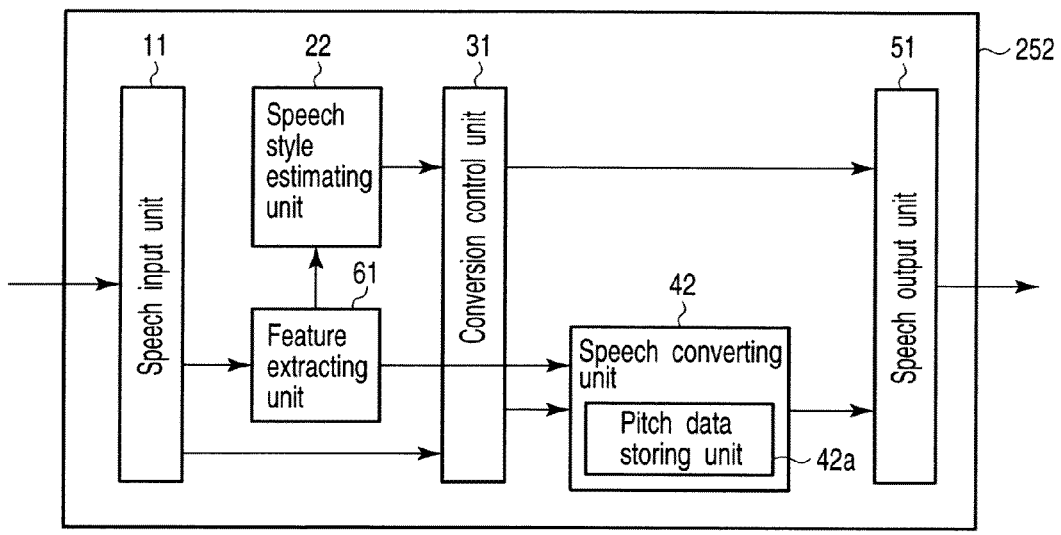
F I G. 8

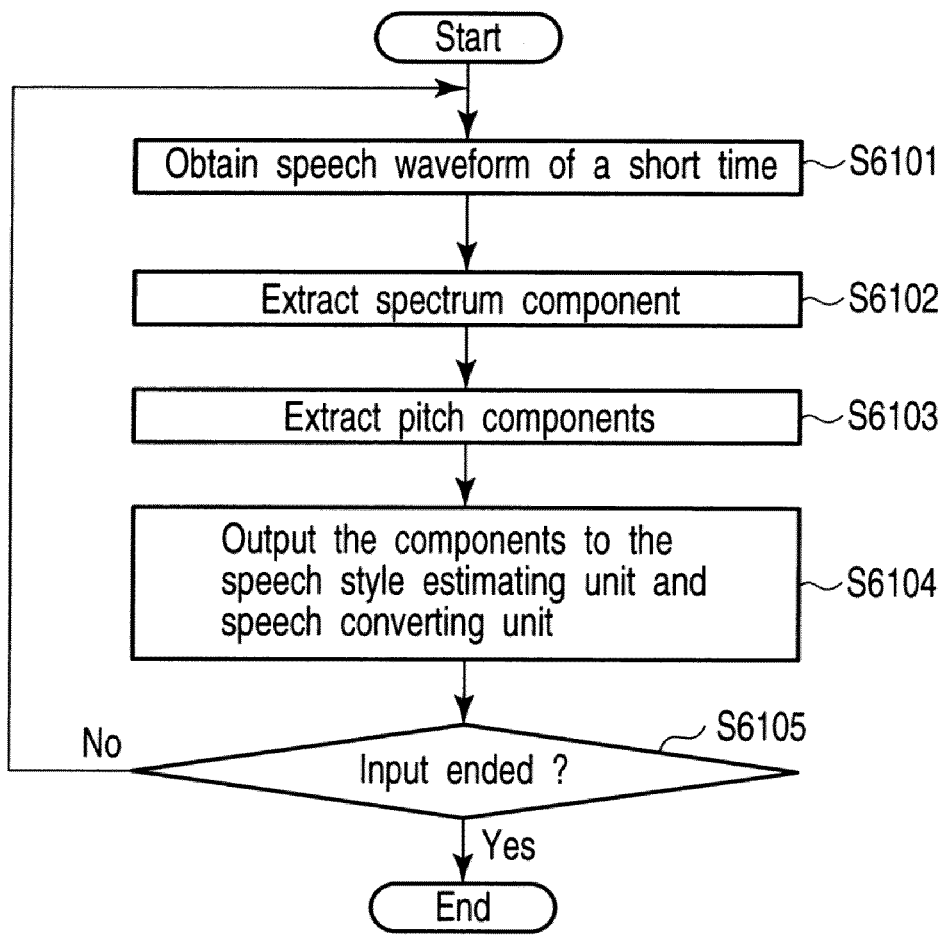
F I G. 9

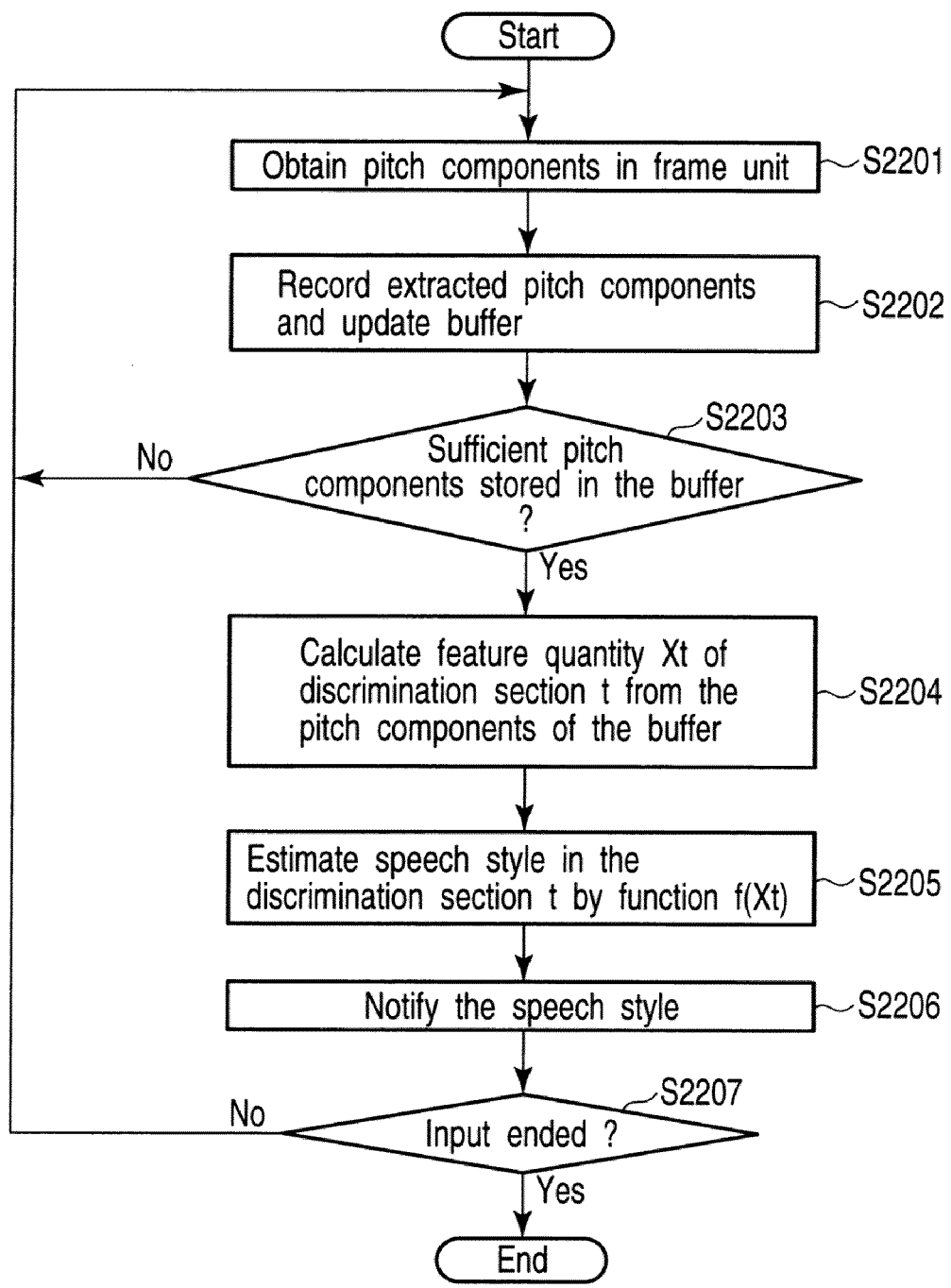
F I G. 10

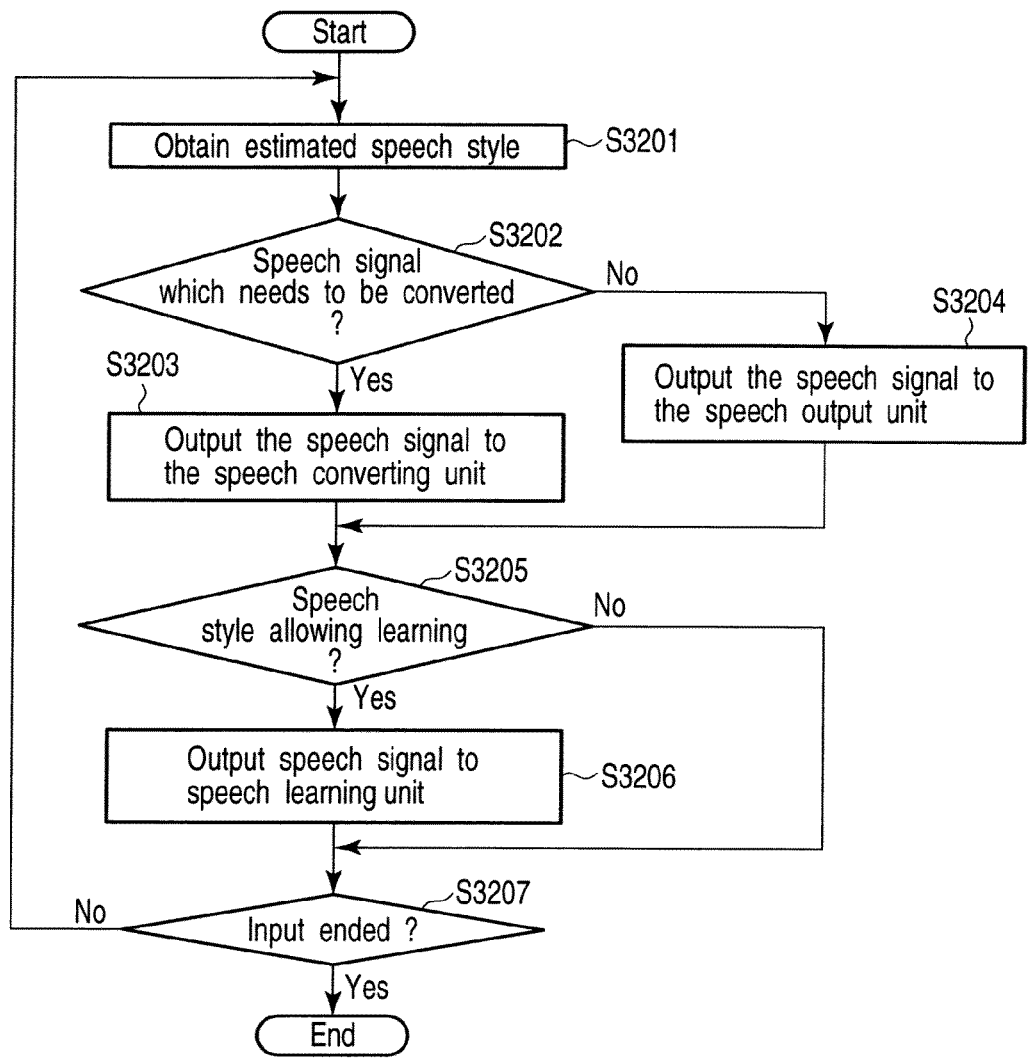
F I G. 21

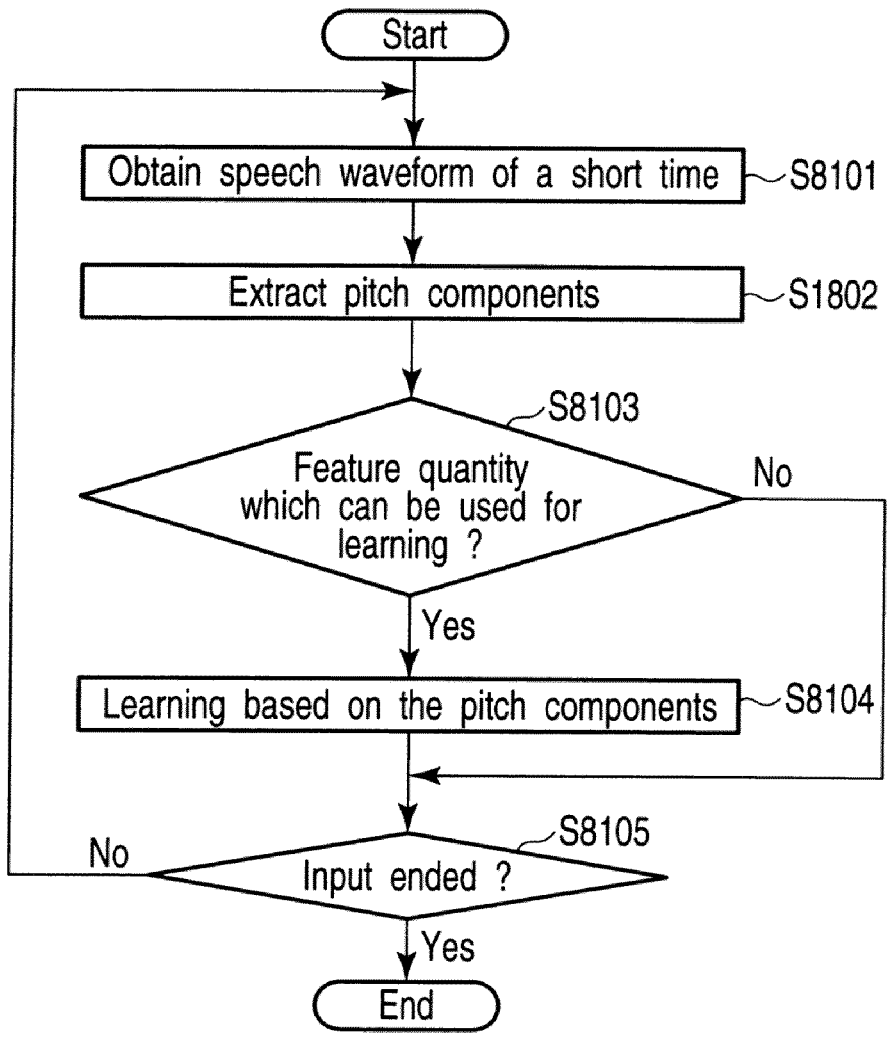
F I G. 22

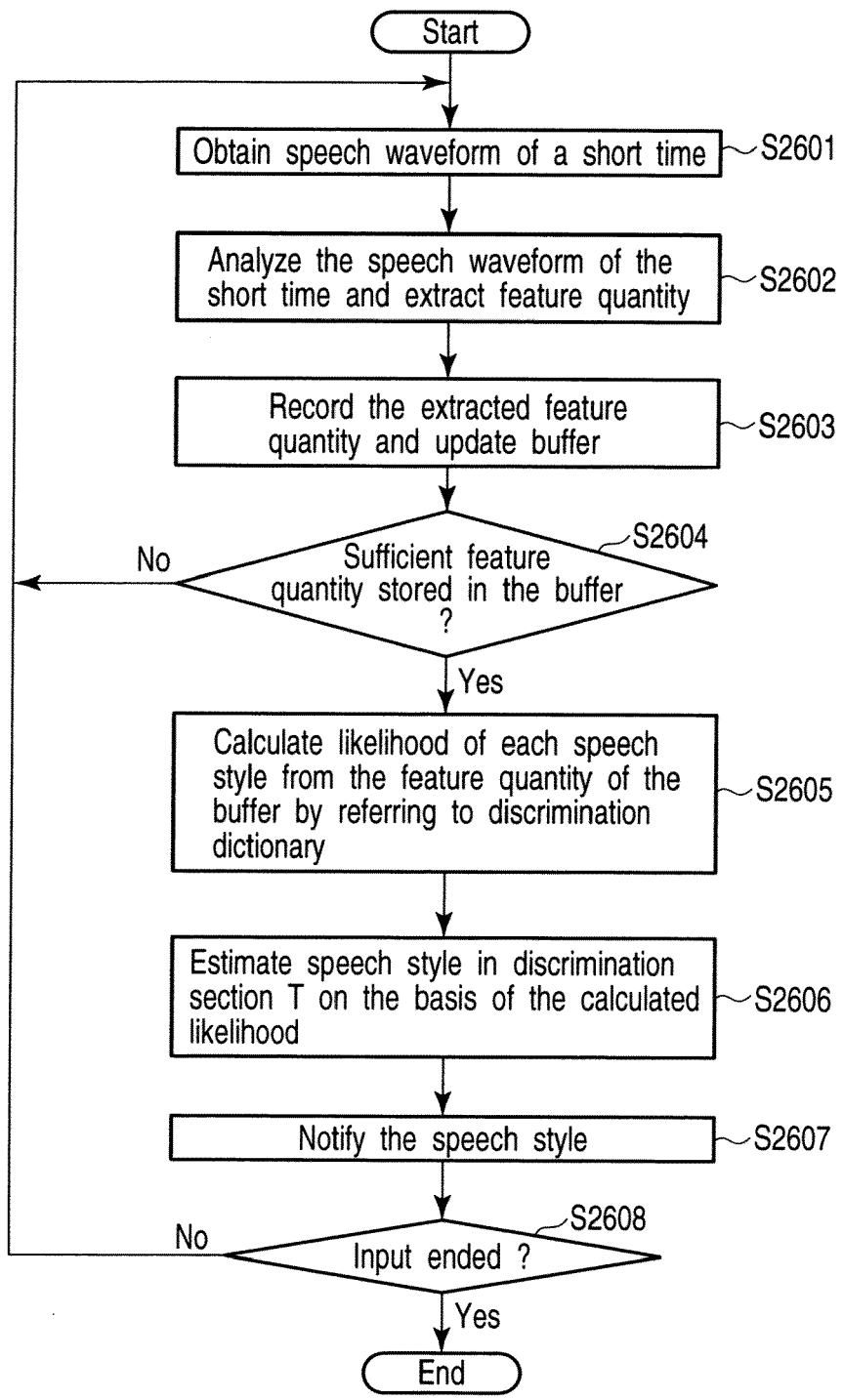
F I G. 3 2

MOBILE RADIO TERMINAL, SPEECH CONVERSION METHOD AND PROGRAM FOR THE SAME

CROSS-REFERENCE TO RELATED APPLICATIONS

This application is based upon and claims the benefit of priority from prior Japanese Patent Application No. 2007-245968, filed Sep. 21, 2007, the entire contents of which are incorporated herein by reference.

BACKGROUND OF THE INVENTION

1. Field of the Invention

The present invention relates to a mobile radio terminal comprising a function of converting an unclear speech signal into a clear speech signal.

2. Description of the Related Art

According to a conventional mobile radio terminal, speech such as whisper which can be hardly heard is subjected to a signal process by a speech converting function and converted into a clear speech signal by assigning a missing pitch component thereto (cf., for example, JP-A H9-90993(KOKAI).

In the actual environment, however, if a change in environment such as increase in persons around a speaker occurs during the conversation, the speaker suddenly whispers or changes his speech style. In the conventional mobile radio terminal, the user needs to change the speech converting function in accordance with the speech style, and cannot seemly execute the speech converting function.

In the conventional mobile radio terminal, the user needs to change the speech converting function in accordance with the speech style, and cannot seemly execute the speech converting function.

An object of the present invention is to provide a mobile radio terminal, speech conversion method and program for the same, capable of changing the speech converting function in accordance with the user's speech style without user operations.

BRIEF SUMMARY OF THE INVENTION

An aspect of the present invention is provides a speech input unit which inputs a speech signal obtained from speech of a speaking person, a converter which converts the speech signal, an estimating unit which estimates a speech style of the speaking person from the speech signal, and a control unit which controls the conversion of a converter in accordance with the estimated speech style.

BRIEF DESCRIPTION OF THE SEVERAL VIEWS OF THE DRAWING

FIG. 7 shows a flowchart of operations of a speech converting unit;

FIG. 8 shows a block diagram of a configuration of a speech converter;

FIG. 9 shows a flowchart of operations of a feature extracting unit;

FIG. 10 shows a flowchart of operations of a speech style estimating unit;

FIG. 21 shows a flowchart of operations of a conversion control unit;

FIG. 22 shows a flowchart of operations of a conversion learning unit;

FIG. 32 shows a flowchart of operations of a speech style estimating unit.

DETAILED DESCRIPTION OF THE INVENTION

Embodiments of the present invention will be explained below with reference to the accompanying drawings.

Figure 1:
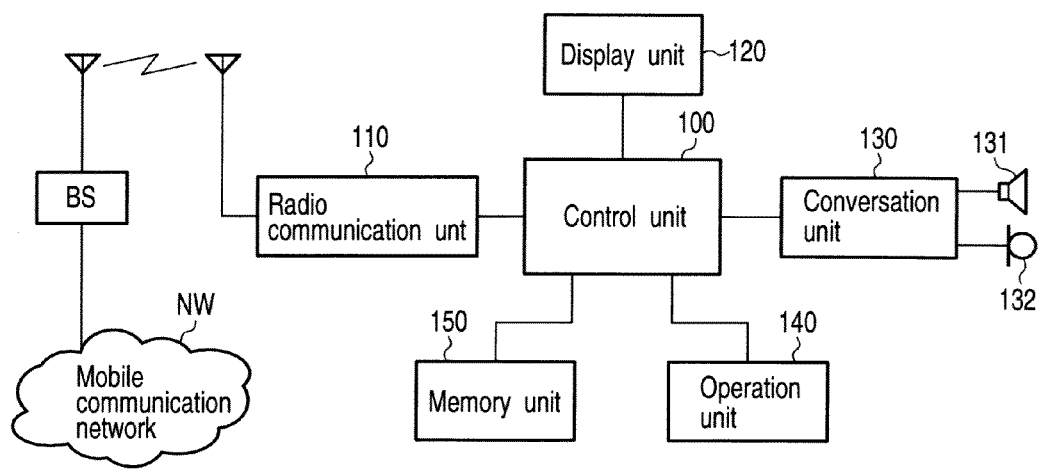
FIG. 1 shows a block diagram of a configuration of a mobile radio terminal.

FIG. 1 is a block diagram showing a configuration of a mobile radio terminal equipped with a speech converter according to an embodiment of the present invention. The mobile radio terminal comprises as its main constituent elements, a control unit 100, a radio communications unit 110, a display unit 120, a conversation unit 130, an operation unit 140, and a memory unit 150 as shown in FIG. 1. The speech converter is applied to the speech transmitting side in the embodiments described below, but can also be applied to the speech receiving side.

The radio communications unit 110 establishes radio communications with a base station terminal BS accommodated in a mobile communications network NW, under an instruction from the control unit 100.

The display unit 120 displays images (still images and moving images), character and letter information, and the like to visually transmit them to the user, under an instruction from the control unit 100.

Figure 2:
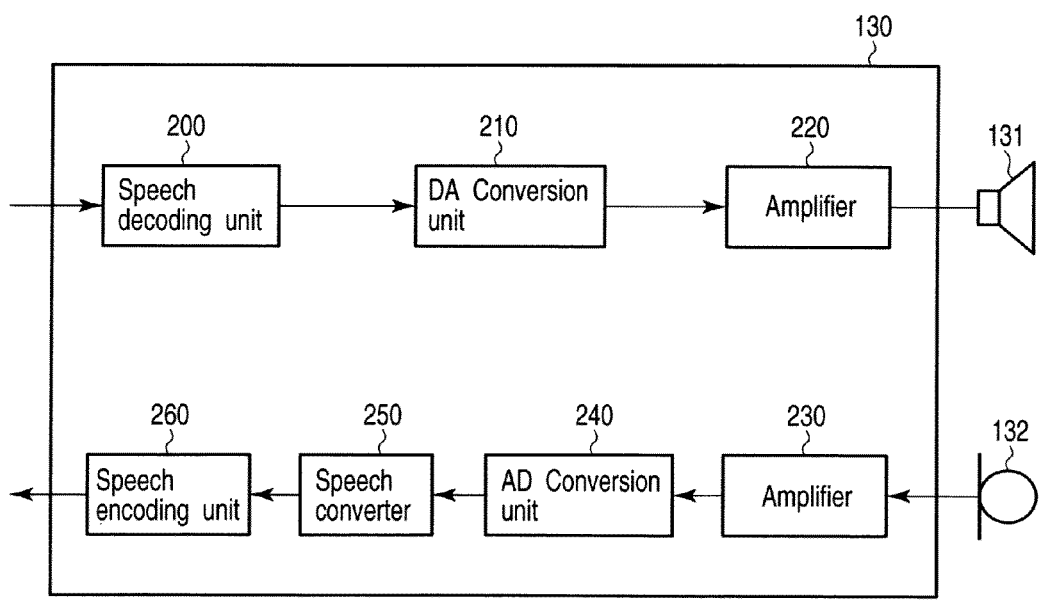
FIG. 2 shows a block diagram of a configuration of a conversation unit shown in FIG. 1.

The conversation unit 130 comprises a speaker 131 and a microphone 132 as shown in FIG. 2 to convert the user's speech into speech data and output the speech data to the control unit 100, and decode speech data received from a conversation partner or the like and output the decoded speech data from the speaker 131. In other words, the conversation unit 130 comprises the speaker 131, the microphone 132, a speech decoding unit 200, a DA conversion unit 210, amplifiers 220, 230, an AD conversion unit 240, a speech converter 250, and a speech encoding unit 260.

The speech data supplied from the control unit 100 is decoded to a digital speech signal by the speech decoding unit 200. The digital speech signal is converted by the DA conversion unit 210 into an analog speech signal, which is amplified by the amplifier 220 and output from the speaker 131.

The transmission speech emitted from the user is converted by the microphone 132 into an electric signal, which is amplified by the amplifier 230. The analog speech signal is converted into a digital speech signal by the AD conversion unit 240. The digital speech signal, which is an unclear signal, is converted into a clear signal by the speech converter 250.

More specifically, the speech converter 250 estimates a speech style (general voice, whisper, loud voice, or the like) of a speaking person from the digital speech signal and automatically selects a section to be converted. The digital speech signal converted by the speech converter 250 is encoded and converted by the speech encoding unit 260 into bit-stream data, which is output to the control unit 100.

The operation unit 140 comprises a plurality of key switches and the like to accept directions from the user therethrough.

The memory unit 150 stores control programs and control data of the control unit 100, application software, address data in which names, telephone numbers and the like of the communication partners are associated, transmitted and received e-mail data, Web data downloaded by the Web browsing, downloaded streaming data, and the like.

The control unit 100 comprises a microprocessor, operates by the control programs and control data stored in the memory unit 150, controls all the units in the mobile radio terminal and implements the speech and data communications. In addition, the control unit 100 operates by the application software stored in the memory unit 150, and comprises a communication control function of displaying the moving images on the display unit 120 and executing the speech communications on the basis of the e-mail transmission and reception, Web browsing, and the downloaded streaming data.

(First Embodiment)

Figure 3:
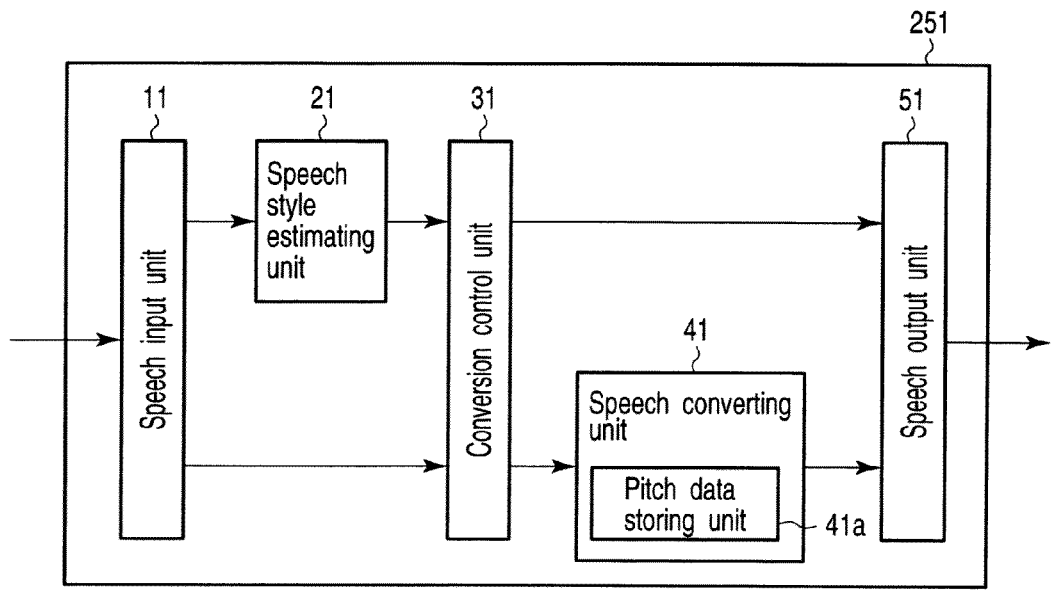
FIG. 3 shows a block diagram of a configuration of a speech converter.

Next, a speech converter 251 shown in FIG. 3 will be described as a first embodiment of the speech converter 250. The speech converter 251 comprises a speech input unit 11, a speech style estimating unit 21, a conversion control unit 31, a speech converting unit 41, and a speech output unit 51 as shown in FIG. 3.

The speech input unit 11 inputs the digital speech signal from the AD conversion unit 240 of the prior stage, and outputs the digital speech signal to the speech style estimating unit 21 and the conversion control unit 31.

The speech style estimating unit 21 analyzes the digital speech signal input from the speech input unit 11, and estimates the speech style in which the input speech has been made, on the basis of the result of analysis. The speech style estimated by the speech style estimating unit 21 is output to the conversion control unit 31. Details of the operation of the speech style estimating unit 21 will be described later.

The conversion control unit 31 buffers the digital speech signal input from the speech input unit 11, and determines whether the digital speech signal input from the speech input unit 11 should be output to the speech output unit 51 or the speech converting unit 41 on the basis of the speech style estimated by the speech style estimating unit 21.

Such speech conversion may not be executed by the speech converting unit 41 on the basis of the output of change according to the speech style, but the digital speech signal may be output to the speech converting unit 41 at any time and the speech converting unit 41 may dynamically change the method of speech conversion in accordance with the speech style. Details of the operation of the conversion control unit 31 will be described later.

The speech converting unit 41 comprises a pitch data storing unit 41a which stores pitch data. The pitch data storing unit 41a stores typical pitch components (frequency Ff and strength Sf) of the digital speech signal, and a speech waveform in association with each other. Then, the speech converting unit 41 executes a signal process by using the pitch data stored in the pitch data storing unit 41a such that a speech of the digital speech signal input via the conversion control unit 31 can easily be heard, converts the digital speech signal, and outputs the converted digital speech signal to the speech output unit 51. Details of the operation of the speech converting unit 41 will be described later.

The speech output unit 51 buffers the digital speech signal output from the conversion control unit 31 or the speech converting unit 41, and outputs the buffered digital speech signal to the speech encoding unit 260 of the subsequent stage. If the digital speech signal is output by changing the conversion control unit 31 to the speech converting unit 41 or the speech converting unit 41 to the conversion control unit 31, the digital speech signals are output from the units to the speech encoding unit 260 so as to be sequential.

Next, the operations of the units in the speech converter 251 according to the first embodiment will be described in detail.

Figure 4:
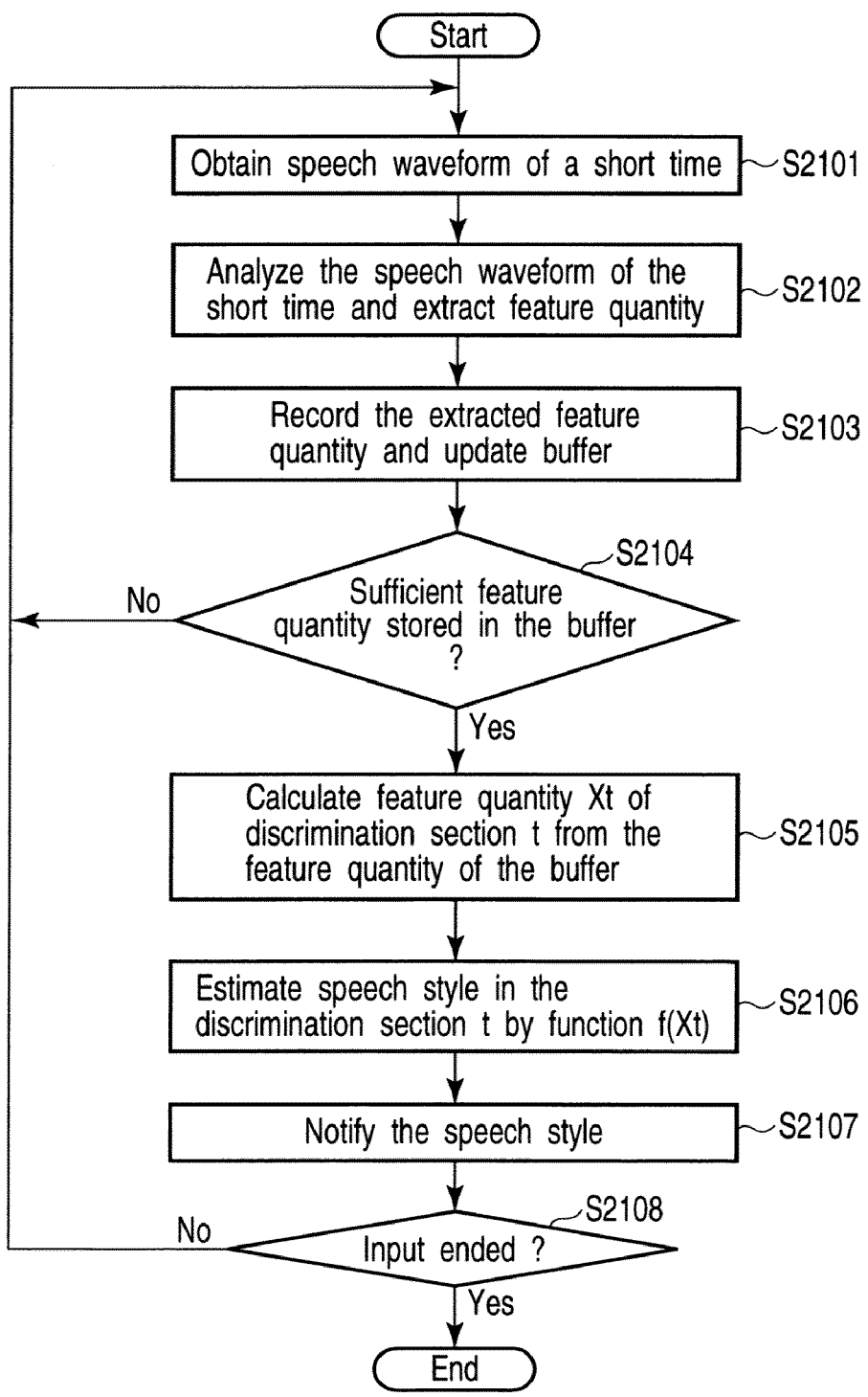
FIG. 4 shows a flowchart of operations of a speech style estimating unit.

First, the details of the operation of the speech style estimating unit 21 will be described with reference to a flowchart of FIG. 4. The speech style estimating unit 21 processes the input digital speech signal and distinguishes a general voice and a whisper on the basis of the volume.

Figure 5:
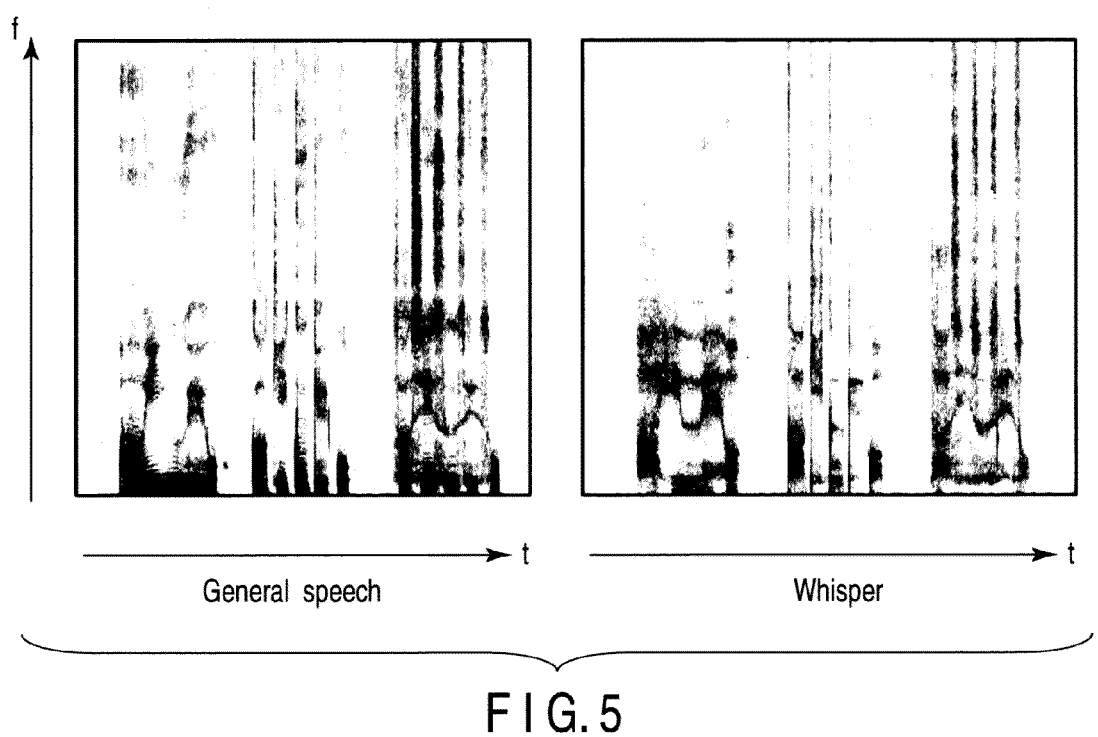
FIG. 5 shows illustrations of speech spectra.
Figure 11:
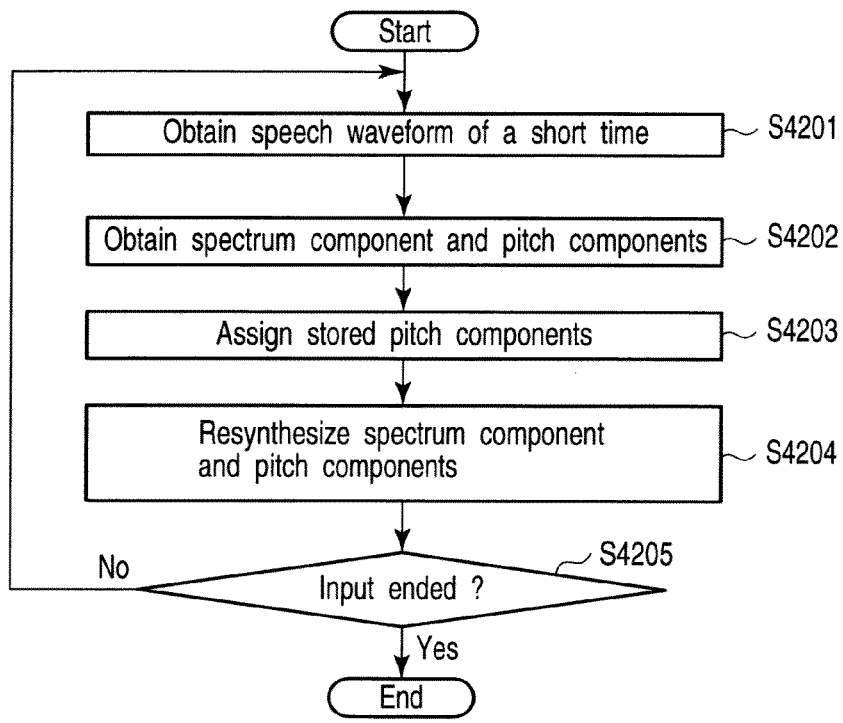
FIG. 11 shows a flowchart of operations of a speech converting unit.

FIG. 5 shows a result of spectrum analysis of a general voice and a whisper. In FIG. 5, three left blocks show spectrum components for the general voice, three right blocks show spectrum components for the whisper, and shading shows strength. By comparing the spectrum components, differences in speech volume and strength of pitch components, and various differences in magnitude of spectrum peak in the low band can be understood.

First, in step S2101, the speech style estimating unit 21 cuts out of the digital speech signal input from the speech input unit 11, the speech data included therein, in terms of frame length F1 and frame shift Fs. Then, the speech style estimating unit 21 proceeds to step S2102. The frame is a basic unit in the estimating process of the speech style and the converting process of the speech converting unit 41. For example, frame length F1 can be set at 25 ms and frame shift Fs can be set at 10 ms. For this reason, the speech data cut out in each frame has a portion overlapping between adjacent frames.

In step S2102, the speech style estimating unit 21 analyzes the speech data cut out in step S2101 in each frame, and thereby extracts the feature of the speech data in each frame. Then, the speech style estimating unit 21 proceeds to step S2103. In this embodiment, since the speech style is estimated in accordance with the speech volume, power spectrum is extracted from the speech data by, for example Fast Fourier Transform (FFT), and the feature quantity in each frame is calculated by calculating power Pi (i: frame number) from the extracted power spectrum.

In step S2103, the speech style estimating unit 21 stores the feature quantity in frame unit calculated in step S2102 in a buffer. Then, the speech style estimating unit 21 proceeds to step S2104. The buffer is provided in the speech style estimating unit 21 and is capable of storing the feature quantity in a plurality of frames corresponding to, for example, at least 1 second. By comprising the buffer, the speech style estimating unit 21 can discriminate the speech style from the power components of a plurality of frames, and can discriminate the speech style more stably than the discrimination from the power component of one frame. In step S2103, too, the speech style estimating unit 21 overwrites the memory area such that only new feature quantities needed for discrimination of the subsequent stage remains, to efficiently use the memory area of the buffer.

In step S2104, the speech style estimating unit 21 discriminates whether the feature quantity of a section length (for example, 1 second) needed for discrimination is stored in the buffer. For example, if the leading section of the digital speech signal is processed, the feature quantities of a sufficient section length is not stored in the buffer and, therefore, the speech style estimating unit 21 proceeds to step S2101 to obtain the speech waveform of a next frame. If the feature quantities of a sufficient section length is stored in the buffer, the speech style estimating unit 21 proceeds to step S2105.

In step S2105, the speech style estimating unit 21 obtains representative feature quantity Xt of section length t. For example, the speech style estimating unit 21 obtains an average power from the following formula (1) as the representative feature quantity X and then proceeds to step S2106. For example, if the section length t is set at 1 second, the speech style estimating unit 21 obtains the average power (representative feature quantity) as Xt from feature quantities Pi of 100 frames (N=100).

$$Xt = \Sigma Pi/N \quad (1)$$

In step S2106, the speech style estimating unit 21 substitutes the representative feature quantity Xt obtained in step S2105 into preset function f(Xt), compares the substitution result with the threshold value, and estimates the speech style. Then the speech style estimating unit 21 proceeds to step S2107. For example, if the function f(Xt) exceeds preset threshold value Tx, the speech style estimating unit 21 discriminates that the general speech is made in this section. On the other hand, if the function f(Xt) is equal to or greater than threshold value Ty (<Tx) and is smaller than Tx, the speech style estimating unit 21 discriminates that the speech is made with whisper in this section. In addition, if the function f(Xt) is smaller than the threshold value Ty, the speech style estimating unit 21 discriminates that conversation is not made (no speech) in this section.

In step S2107, the speech style estimating unit 21 notifies the conversion control unit 31 of the speech style obtained by the discrimination in step S2106. Then, the speech style estimating unit 21 proceeds to step S2108.

In step S2108, the speech style estimating unit 21 discriminates whether or not the input of the digital speech signal from the speech input unit 11 has been interrupted. If the input has been interrupted, the speech style estimating unit 21 ends the process. If the input has not been interrupted, the speech style estimating unit 21 proceeds to step S2101 to execute a process for a next frame.

As described above, the speech style estimating unit 21 repeats the estimation of the speech style in frame unit, and stops the process if the input of the digital speech signal is interrupted or restarts the process if the input is executed again.

Figure 6:
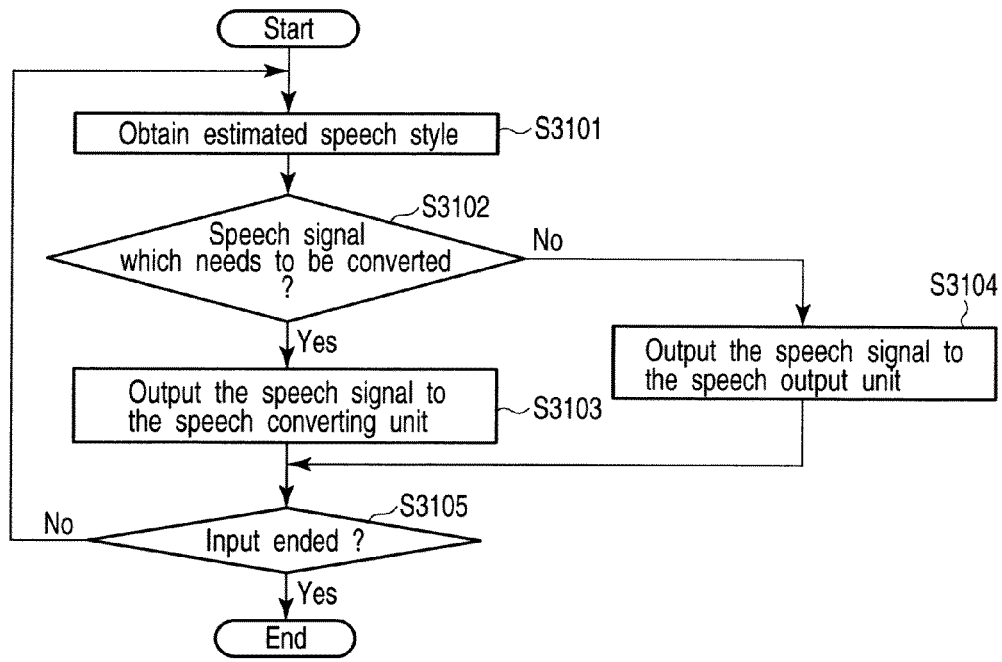
FIG. 6 shows a flowchart of operations of a conversion control unit.

Next, details of the operation of the conversion control unit 31 will be described with reference to a flowchart of FIG. 6. As described above, the conversion control unit 31 controls the operation of the speech converting unit 41 at the subsequent stage in a case where the speech style is discriminated as whisper or other cases.

In step S3101, the conversion control unit 31 obtains the speech style estimated by the speech style estimating unit 21. Then, the conversion control unit 31 proceeds to step S3102. In this embodiment, three types of speech, i.e. whisper, general speech and no speech are discriminated by the speech style estimating unit 21 as described above, and a result of the discrimination is input.

In step S3102, the conversion control unit 31 discriminates whether or nor a process of converting the digital speech signal by the speech converting unit 41 is required, on the basis of the speech style obtained in step S3101. If the speech style is whisper, the conversion control unit 31 discriminates that the converting process is required, and proceeds to step S3103. On the other hand, if the speech style is general speech or no speech, the conversion control unit 31 discriminates that the converting process is not required, and proceeds to step S3104.

In step S3103, the conversion control unit 31 outputs to the speech converting unit 41 the digital speech signals in the frame in which the speech style is discriminated as whisper by the speech style estimating unit 21 and frames of predetermined sections before and after the frame. The conversion control unit 31 proceeds to step S3105.

In step S3104, the conversion control unit 31 outputs to the speech output unit 51 the digital speech signal in the frame in which the speech style is discriminated as general speech or no speech by the speech style estimating unit 21. The conversion control unit 31 proceeds to step S3105.

In step S3105, the conversion control unit 31 discriminates whether or not the input of the digital speech signal from the speech input unit 11 has been interrupted. If the input has been interrupted, the conversion control unit 31 ends this process. On the other hand, if the input has not been interrupted, the conversion control unit 31 returns to step S3101 and executes the process of a next frame.

Next, details of the operation of the speech converting unit 41 will be described with reference to a flowchart of FIG. 7. When the speech style is discriminated as whisper as described above, the speech converting unit 41 inputs the digital speech signal from the conversion control unit 31 and executes a process shown in FIG. 7 for each frame. In this example, the speech converting unit 41 converts the input speech into speech which can easily be heard by adding the pitch component to the input digital speech signal.

In S4101, the speech converting unit 41 obtains the digital speech signals in the frame in which whisper is discriminated by the speech style estimating unit 21 and the frames in predetermined sections before and after the frame, from the digital speech signal input from the conversion control unit 31, and cuts out the speech data in frame length F1 and frame shift Fs from the digital speech signals. Then, the speech converting unit 41 proceeds to step S4102. The frame length and the frame shift may be the same as those of the speech style estimating unit 21.

In step S4102, the speech converting unit 41 analyzes the speech data cut out in step S4101 for each frame, and thereby extracts a spectrum component for each frame. Then, the speech converting unit 41 proceeds to step S4103. As the analyzing method, for example, linear prediction analysis (LPC) can be employed. The spectrum component may be expressed by extracted linear prediction coefficient $\alpha i$ ($i=1, 2, \ldots, N$: N represents an analysis dimension).

In step S4103, the speech converting unit 41 analyzes the speech data cut out in step S4101 for each frame, and thereby extracts pitch components (frequency and strength) of each frame. Then, the speech converting unit 41 proceeds to step S4104. As the method of extracting the pitch components, for example, a method of calculating predictive residual signal ri ($i=1, 2, \ldots, N$: N represents an analysis dimension) from which the spectrum component extracted from the speech waveform in step S4102 is removed, by using the speech waveform and the linear prediction (LPC) coefficient $\alpha i$ and obtaining frequency Ff and strength Sf of the pitch components from an auto-correlation function of the predictive residual signal ri can be employed.

In step S4104, the speech converting unit 41 reads the speech waveform corresponding to the pitch components extracted in step S4103 from the pitch data storing unit 41$a$, and obtains a predictive residual signal to which the pitch components are assigned by adding the voiced source signal and the predictive residual signal. Then, the speech converting unit 41 proceeds to step S4105. In this embodiment, the pitch data storing unit 41$a$ is provided. Instead of this, however, a simple pulse signal may be repeatedly generated in response to the pitch cycle obtained in step S4103 and may be added to the speech data of the frame corresponding thereto.

In step S4105, the speech converting unit 41 synthesizes the predictive residual signal (ri) to which the pitch components are assigned in step S4104 and the linear prediction coefficient ($\alpha i$) extracted as the spectrum component in step S4103 by urging them to pass through a synthesis filter. The speech converting unit 41 thereby obtains the speech data having listenability improved by assigning the pitch components. The speech converting unit 41 outputs the speech data to the speech output unit 51 and ends this process. If a next frame is present, the speech converting unit 41 executes the process shown in FIG. 7 for the next frame.

As described above, in the speech converter 251, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, since the speech converter 251 executes speech conversion in the speech section in which conversion needs to be executed on the basis of the estimated speech style, the speech converter 251 can restrict the speech conversion from being erroneously executed and the speech which cannot easily be heard from being generated. The speech converter 251 also has an effect of restricting the calculation for the section in which the conversion is unnecessary.

In this embodiment, the method of converting whisper into speech which can easily be heard by assigning the pitch components in the speech converter 251, but the present invention is not limited to this method. For example, the input speech can be converted by using a converting filter emphasizing the only spectrum of the formant band in which whisper and the general voice are different.

Such a converting filter can learn by using the speech data to be converted and the converted speech data. Thus, any existing speech converting method can be incorporated into the present invention. As the speech style, whisper and general voice are explained, but the present invention is not limited to those. For example, it is also possible to convert the speech into speech which can easily be heard by defining voice of a high speaking speed and voice of a low speaking speed and by executing speaking speed conversion by the speech converter 251.

(Second Embodiment)

Next, a speech converter 252 shown in FIG. 8 will be described as a second embodiment of the speech converter 250. The speech converter 252 comprises a speech input unit 11, a speech style estimating unit 22, a conversion control unit 31, a speech converting unit 42, a speech output unit 51 and a feature extracting unit 61 as shown in FIG. 8.

The speech input unit 11 accepts an input of the digital speech signal from the AD conversion unit 240 of the prior stage, and outputs the digital speech signal to the conversation control unit 31 and the feature extracting unit 61.

The feature extracting unit 61 extracts a spectrum component of the digital speech signal, and extracts a predictive residual signal ri ($i=1, 2, \ldots, N$: N represents an analysis dimension) and pitch components (frequency Ff and strength Sf) for each frame as a feature quantity of the digital speech signal, on the basis of the linear prediction (LPC) coefficient $\alpha i$ which is the spectrum component.

The extracted pitch components are output to not only the speech style estimating unit 22, but also the speech converting unit 42 since the extracted pitch components can also be applied to a converting process in the speech converting unit 42. Thus, duplication of the process of extracting the pitch components can be avoided and the process can be executed efficiently by sharing the pitch components by the speech style estimating unit 22 and the speech converting unit 42. In addition, the predictive residual signal ri and the linear prediction coefficient $\alpha i$ which is the spectrum components are output to the speech converting unit 42, and the extraction of the signal can also be processed efficiently. Details of the operation of the feature extracting unit 61 will be described later.

The speech style estimating unit 22 analyzes the pitch components extracted by the feature extracting unit 61, and estimates the speech style in which the input speech has been made, on the basis of the result of analysis. The speech style estimated by the speech style estimating unit 22 is output to the conversion control unit 31. Details of the operation of the speech style estimating unit 22 will be described later.

The conversion control unit 31 buffers the digital speech signal input from the speech input unit 11, and determines whether the digital speech signal input from the speech input unit 11 should be output to the speech output unit 51 or the speech converting unit 42 on the basis of the speech style estimated by the speech style estimating unit 22.

Such speech conversion may not be executed by the speech converting unit 42 on the basis of the output of change according to the speech style, but the digital speech signal may be output to the speech converting unit 42 at any time and the speech converting unit 42 may dynamically change the method of speech conversion in accordance with the speech style. Details of the operation of the conversion control unit 31 are the same as those of the first embodiment described with reference to FIG. 6 and, therefore, are not described here.

The speech converting unit 42 comprises a pitch data storing unit 42a which stores pitch data. The pitch data storing unit 42a stores typical pitch components (frequency and strength) and a speech waveform in association with each other. Then, the speech converting unit 42 executes a signal process by using the pitch components and spectrum component extracted by the feature extracting unit 61 and the pitch data stored in the pitch data storing unit 42a such that a speech of the digital speech signal input via the conversion control unit 31 can easily be heard, converts the digital speech signal, and outputs the converted digital speech signal to the speech output unit 51. Details of the operation of the speech converting unit 42 will be described later.

The speech output unit 51 buffers the digital speech signal output from the conversion control unit 31 or the speech converting unit 42, and outputs the buffered digital speech signal to the speech encoding unit 260 of the subsequent stage. If the digital speech signal is output by changing the conversion control unit 31 to the speech converting unit 42 or the speech converting unit 42 to the conversion control unit 31, the digital speech signals are output from the units to the speech encoding unit 260 so as to be sequential.

Next, the operations of the units in the speech converter 252 according to the second embodiment will be described in detail. First, details of the operation of the feature extracting unit 61 will be described with reference to a flowchart of FIG. 9.

In S6101, the feature extracting unit 61 cuts out the speech data included in the digital speech signal input from the speech input unit 11, in frame length F1 and frame shift Fs. Then, the feature extracting unit 61 proceeds to step S6102. The frame is a basic unit in the estimating process of the speech style of the speech style estimating unit 22 and the converting process of the speech converting unit 42. For example, frame length F1 can be set at 25 ms and frame shift Fs can be set at 10 ms. For this reason, the speech data cut out in each frame has a portion overlapping between adjacent frames. The frame length and the frame shift may be the same as those of the speech style estimating unit 21 of the first embodiment.

In step S6102, the feature extracting unit 61 analyzes the speech data cut out in step S6101 for each frame, and thereby extracts the spectrum component for each frame. Then, the feature extracting unit 61 proceeds to step S6103. As the analyzing method, for example, linear prediction analysis (LPC) can be employed. The spectrum component may be expressed by extracted linear prediction coefficient $\alpha i$ ($i=1, 2, \ldots, N$: N represents an analysis dimension).

In step S6103, the feature extracting unit 61 analyzes the speech data cut out in step S6101 for each frame, and thereby extracts pitch components (frequency Ff and strength Sf) of each frame. Then, the feature extracting unit 61 proceeds to step S6104. As the method of extracting the pitch components, for example, a method of calculating predictive residual signal ri ($i=1, 2, \ldots, N$: N represents an analysis dimension) from which the spectrum component extracted from the speech waveform in step S6102 is removed, by using the speech waveform and the linear prediction (LPC) coefficient $\alpha i$ and obtaining frequency Ff and strength Sf of the pitch components from an auto-correlation function of the predictive residual signal ri can be employed.

In step S6104, the feature extracting unit 61 outputs the pitch components extracted in step S6103 to the speech style estimating unit 22 and the speech converting unit 42. In addition, the feature extracting unit 61 outputs the predictive residual signal ri calculated at the time of obtaining the pitch components in step S6103 and the linear prediction coefficient $\alpha i$ that corresponds to the spectrum component extracted in step S6102, to the speech converting unit 42.

In step S6105, the feature extracting unit 61 discriminates whether or not the input of the digital speech signal from the speech input unit 11 is interrupted. If the input of the digital speech signal is interrupted, the feature extracting unit 61 ends this process. If the input of the digital speech signal is not interrupted, the feature extracting unit 61 proceeds to step S6101 to extract the spectrum component and the pitch components for a next frame.

Next, the details of the operation of the speech style estimating unit 22 will be described with reference to a flowchart of FIG. 10. The speech style estimating unit 22 processes the input digital speech signal and distinguishes a general voice and a whisper on the basis of the strength in the pitch components.

First, in step S2201, the speech style estimating unit 22 obtains the pitch components extracted by the feature extracting unit 61, in a frame unit. Then, the speech style estimating unit 22 proceeds to step S2202.

In step S2202, the speech style estimating unit 22 stores the pitch components in a frame unit obtained in step S2201, in the buffer. The buffer is provided in the speech style estimating unit 22 and is capable of storing the pitch components in a plurality of frames corresponding to, for example, at least 1 second. By comprising the buffer, the speech style estimating unit 22 can discriminate the speech style from the pitch components in a plurality of frames, and can discriminate the speech style more stably than the discrimination from the pitch components in one frame. In step S2202, too, the speech style estimating unit 22 overwrites the old memory such that only new pitch components remain at the subsequent stage, to efficiently use the memory area of the buffer.

In a case where the speech style estimating unit 22 estimates the speech style in terms of the strength in the pitch components, the speech style estimating unit 22 discriminates a section of strong pitch components as the general speech and discriminates a section of weak pitch components as whisper. Since a unvoiced sound including no pitch components is also included in the general voice, the speech style estimating unit 22 cannot stably discriminate the voice with the pitch components of a short section. To solve this in this embodiment, the pitch components included in a section of, for example, approximately 1 second, are stored in the buffer.

In step S2203, the speech style estimating unit 22 discriminates whether the pitch components of a section length (for example, 1 second) needed for discrimination is stored in the buffer. For example, if the leading section of the digital speech signal is processed, the feature quantity of a sufficient section length is not stored in the buffer and, therefore, the speech style estimating unit 22 proceeds to step S2201 to obtain the pitch components of a next frame. If the feature quantity of a sufficient section length is stored in the buffer, the speech style estimating unit 22 proceeds to step S2204.

In step S2204, the speech style estimating unit 22 obtains representative feature quantity Xt of section length t. For example, the speech style estimating unit 22 obtains an average power from the following formula (2) as the representative feature quantity X and then proceeds to step S2205. For example, if the section length t is set at 1 second, the speech style estimating unit 22 obtains the average strength (representative feature quantity) as Xt from the strength of pitch components Sfi (i: frame number) of 100 frames (N=100).

$$Xt = \Sigma Sfi/N \quad (2)$$

In step S2205, the speech style estimating unit 22 substitutes the representative feature quantity Xt obtained in step S2204 into preset function f(Xt), compares the substitution result with the threshold value, and estimates the speech style. Then the speech style estimating unit 22 proceeds to step S2206. For example, if the function f(Xt) exceeds preset threshold value Tx, the speech style estimating unit 22 discriminates that the general speech is made in this section. On the other hand, if the function f(Xt) is equal to or greater than threshold value Ty (<Tx) and is smaller than Tx, the speech style estimating unit 22 discriminates that the speech is made with whisper in this section. In addition, if the function f(Xt) is smaller than the threshold value Ty, the speech style estimating unit 22 discriminates that conversation is not made (no speech) in this section.

In step S2206, the speech style estimating unit 22 notifies the conversion control unit 31 of the speech style obtained by the discrimination in step S2205. Then, the speech style estimating unit 22 proceeds to step S2207.

In step S2207, the speech style estimating unit 22 discriminates whether or not the input of the digital speech signal from the speech input unit 11 has been interrupted. If the input has been interrupted, the speech style estimating unit 22 ends the process. If the input has not been interrupted, the speech style estimating unit 22 proceeds to step S2201 to execute a process for a next frame.

Next, details of the operation of the speech converting unit 42 will be described with reference to a flowchart of FIG. 7. In a case where the speech style is discriminated as whisper as described above, the speech converting unit 42 inputs the digital speech signal from the conversion control unit 31. In this example, the speech converting unit 42 converts the input speech into speech which can easily be heard by adding the pitch components to the input digital speech signal.

In S4201, the speech converting unit 42 obtains the digital speech signals in the frame in which whisper is discriminated by the speech style estimating unit 22 and the frames in predetermined sections before and after the frame, from the digital speech signal input from the conversion control unit 31, and cuts out the speech data in frame length F1 and frame shift Fs from the digital speech signals. Then, the speech converting unit 42 proceeds to step S4202. The frame length and the frame shift may be the same as those of the feature extracting unit 61.

In step S4202, the speech converting unit 42 obtains the linear prediction coefficient αi, the predictive residual signal ri and the pitch components. Then, the speech converting unit 42 proceeds to step S4203.

In step S4203, the speech converting unit 42 reads the speech waveform corresponding to the pitch components obtained in step S4202 from the pitch data storing unit 42a, and obtains a predictive residual signal to which the pitch components are assigned by adding the voiced source signal and the predictive residual signal generated from the read pitch components. Then, the speech converting unit 42 proceeds to step S4204. In this embodiment, the pitch data storing unit 42a is provided. Instead of this, however, a simple pulse signal may be repeatedly generated in response to the pitch cycle obtained in step S4202 and may be added to the speech data of the frame corresponding thereto.

In step S4204, the speech converting unit 42 synthesizes the predictive residual signal (ri) to which the pitch components are assigned in step S4203 and the linear prediction coefficient (αi) extracted as the spectrum component in step S4202 by urging them to pass through a synthesis filter. The speech converting unit 42 thereby obtains the speech data having listenability improved by assigning the pitch components. The speech converting unit 42 outputs the speech data to the speech output unit 51.

In step S4205, the speech converting unit 42 discriminates whether or not the input of the digital speech signal from the conversion control unit 31 has been interrupted. If the input of the digital speech signal has been interrupted, the speech converting unit 42 ends this process. If the input of the digital speech signal has not been interrupted, the speech converting unit 42 proceeds to step S4201 to execute a process of adding the pitch components to a next frame.

As described above, in the speech converter 252, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, since the feature extracting unit 61 is provided in the speech converter 252 and the pitch components extracted in the feature extracting unit 61 is shared by the speech style estimating unit 21 and the speech converting unit 42, the calculation amount in the entire apparatus can be restricted. Besides, the same advantage as that of the speech converter 251 of the first embodiment can be obtained, and the same modification can be made.

(Third Embodiment)

Figure 12:
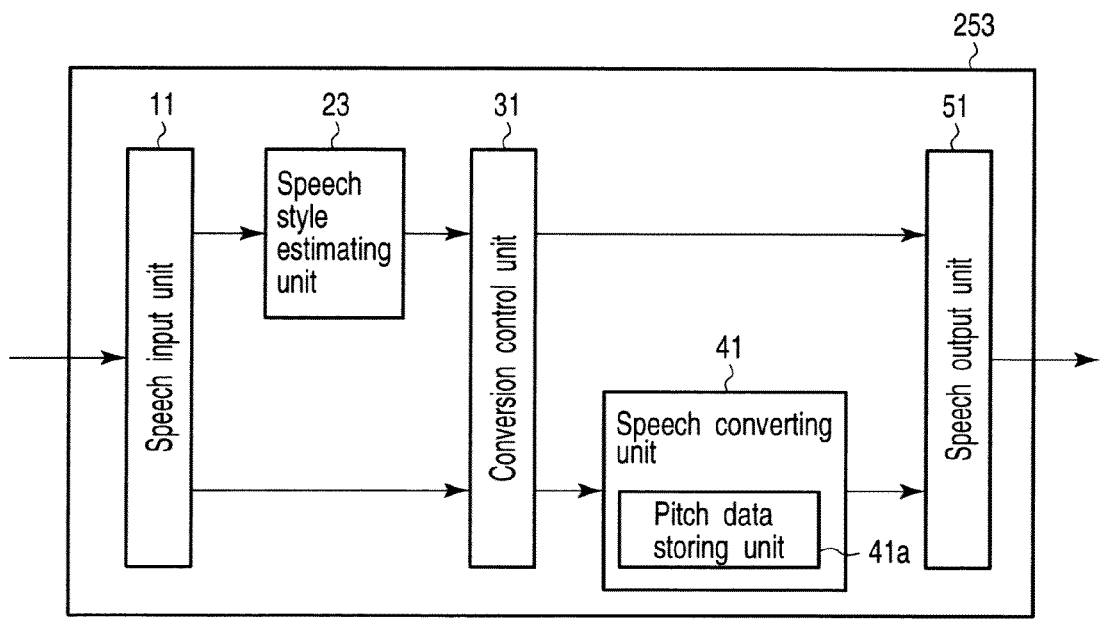
FIG. 12 shows a block diagram of a configuration of a speech converter.

Next, a speech converter 253 shown in FIG. 12 will be described as a third embodiment of the speech converter 250. The speech converter 253 comprises a speech input unit 11, a speech style estimating unit 23, a conversion control unit 31, a speech converting unit 41, and a speech output unit 51 as shown in FIG. 12.

The speech input unit 11 accepts the input of the digital speech signal from the AD conversion unit 240 of the prior stage, and outputs the digital speech signal to the speech style estimating unit 23 and the conversion control unit 31.

The speech style estimating unit 23 analyzes the digital speech signal input from the speech input unit 11, and estimates the speech style in which the input speech has been made, on the basis of the result of analysis. More specifically, the speech style estimating unit 23 focuses on a difference between the strength of the spectrum component in a low band corresponding to the formant of the spectrum component and the strength of the spectrum component in a band higher than the low band, to discriminate the whisper and the general speech, and estimates the speech style from the difference. The speech style estimated by the speech style estimating unit 23 is output to the conversion control unit 31. Details of the operation of the speech style estimating unit 23 will be described later.

The conversion control unit 31 buffers the digital speech signal input from the speech input unit 11, and determines whether the digital speech signal input from the speech input unit 11 should be output to the speech output unit 51 or the speech converting unit 41 on the basis of the speech style estimated by the speech style estimating unit 23.

Such speech conversion may not be executed by the speech converting unit 41 on the basis of the output of change according to the speech style, but the digital speech signal may be output to the speech converting unit 41 at any time and the speech converting unit 41 may dynamically change the method of speech conversion in accordance with the speech style. The details of the operation of the conversion control unit 31 are the same as those of the first embodiment described with reference to FIG. 6 and, therefore, are not described here.

The speech converting unit 41 comprises a pitch data storing unit 41a which stores pitch data. The pitch data storing unit 41a stores typical pitch components (frequency Ff and strength Sf) of the digital speech signal, and a speech waveform in association with each other. Then, the speech converting unit 41 executes a signal process by using the pitch data stored in the pitch data storing unit 41a such that a speech of the digital speech signal input via the conversion control unit 31 can easily be heard, converts the digital speech signal, and outputs the converted digital speech signal to the speech output unit 51. Details of the operation of the speech converting unit 41 are the same as those of the first embodiment described with reference to FIG. 7 and, therefore, are not described here.

The speech output unit 51 buffers the digital speech signal output from the conversion control unit 31 or the speech converting unit 41, and outputs the buffered digital speech signal to the speech encoding unit 260 of the subsequent stage. If the digital speech signal is output by changing the conversion control unit 31 to the speech converting unit 41 or the speech converting unit 41 to the conversion control unit 31, the digital speech signals are output from the units to the speech encoding unit 260 so as to be sequential.

Next, the operations of the units in the speech converter 253 according to the third embodiment will be described in detail.

Figure 13:
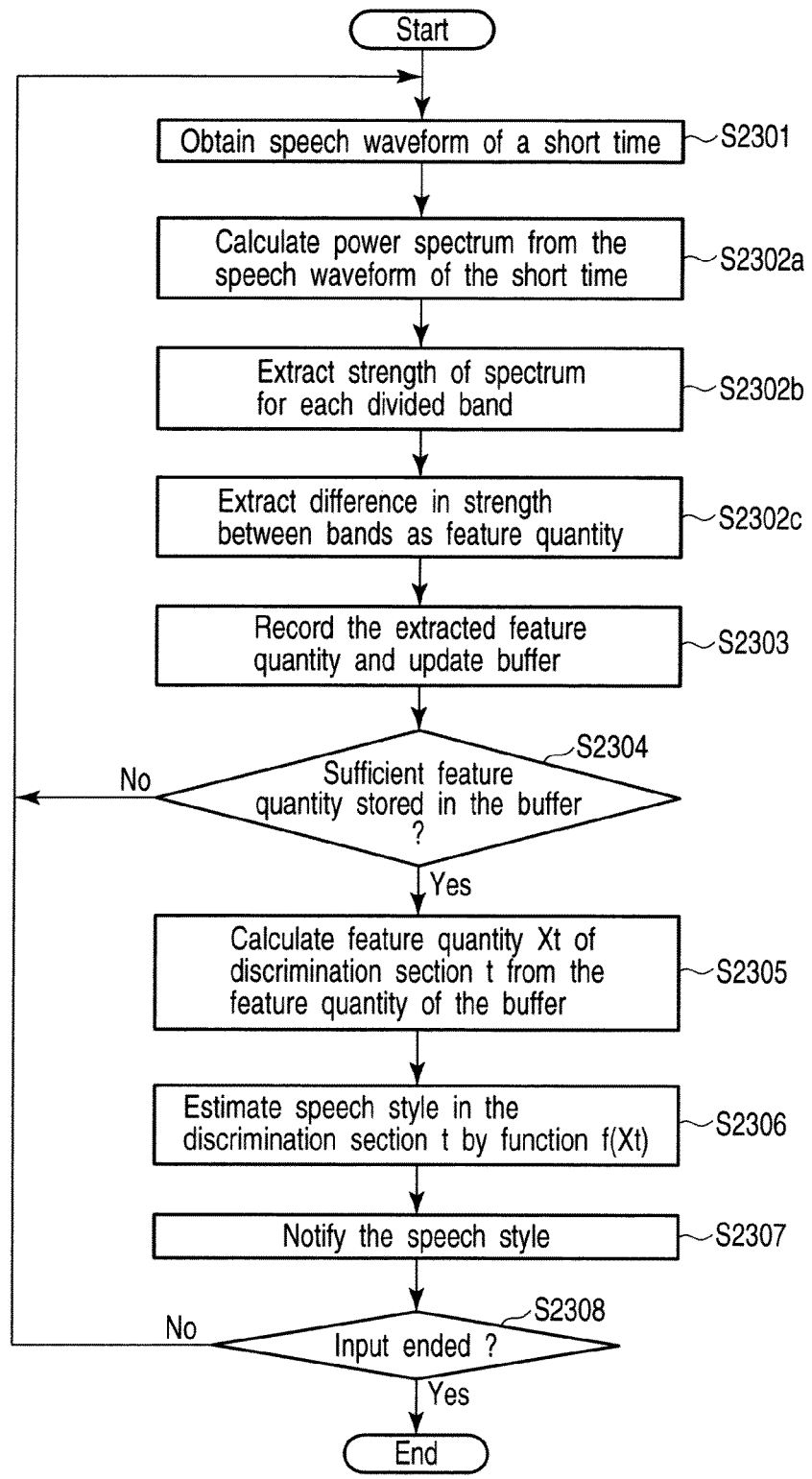
FIG. 13 shows a flowchart of operations of a speech style estimating unit.

The speech converter 253 of the third embodiment is different from the speech converter 251 of the first embodiment in terms of employing the speech style estimating unit 23 instead of the speech style estimating unit 21 employed in the speech converter 251 of the first embodiment. Thus, the following descriptions are mainly focused on the speech style estimating unit 23, with reference to FIG. 13.

First, in step S2301, the speech style estimating unit 23 cuts out of the digital speech signal input from the speech input unit 11, the speech data included therein, in terms of frame length F1 and frame shift Fs. Then, the speech style estimating unit 23 proceeds to step S2302. The frame is a basic unit in the estimating process of the speech style and the converting process of the speech converting unit 41. For example, frame length F1 can be set at 25 ms and frame shift Fs can be set at 10 ms. For this reason, the speech data cut out in each frame has a portion overlapping between adjacent frames.

In steps S2302a-S2302c, the speech style estimating unit 23 analyzes a speech waveform of a short time by analyzing the speech data cut out in step S2301 in each frame, and thereby extracts the feature of the speech data in each frame.

In step S2302a, the speech style estimating unit 23 obtains a power spectrum by processing the speech waveform by Fast Fourier Transform on the basis of the speech data of the frame cut out in step S2301. Then, the speech style estimating unit 23 proceeds to step S2302b.

In step S2302b, the speech style estimating unit 23 calculates the spectrum component of each band from the power spectrum obtained in step S2302a, by using a plurality of bandpass filters different in passband. Then, the speech style estimating unit 23 proceeds to step S2302c. As the simplest setting of the passband of the bandpass filter, two channels in a low band and a high band are in which the formant component is strongly generated about approximately 4 kHz are set. A bandpass filter having more channels (for example, 26 channels) as employed for speech recognition or the like may also be used.

In S2302c, the speech style estimating unit 23 calculates the difference in power spectrum between the bands as feature quantity Di (i: frame number), on the basis of the power spectrum in each band as obtained in step S2302b. For example, if the band is divided into two channels, the difference between the channels may be used as the feature quantity. If the band is divided into a plurality of channels, peaks of the respective channels at which the spectrum component is greatest are compared and their difference is calculated as the feature quantity.

In step S2303, the speech style estimating unit 23 stores the feature quantity in frame unit calculated in step S2302c in a buffer. Then, the speech style estimating unit 23 proceeds to step S2304. The buffer is provided in the speech style estimating unit 23 and is capable of storing the feature quantity in a plurality of frames corresponding to, for example, at least 1 second. By comprising the buffer, the speech style estimating unit 23 can discriminate the speech style from the pitch components of a plurality of frames, and can discriminate the speech style more stably than the discrimination from the pitch components of one frame. In step S2303, too, the speech style estimating unit 23 overwrites the memory area such that only new feature quantity needed for discrimination of the subsequent stage remains, to efficiently use the memory area of the buffer.

In step S2304, the speech style estimating unit 23 discriminates whether the feature quantity of a section length (for example, 1 second) needed for discrimination is stored in the buffer. For example, if the leading section of the digital speech signal is processed, the feature quantity of a sufficient section length is not stored in the buffer and, therefore, the speech style estimating unit 23 proceeds to step S2301 to obtain the speech waveform of a next frame. If the feature quantity of a sufficient section length is stored in the buffer, the speech style estimating unit 23 proceeds to step S2305.

In step S2305, the speech style estimating unit 23 obtains representative feature quantity Dt of section length t. For example, the speech style estimating unit 23 obtains an average power from the following formula (3) as the representative feature quantity Dt and then proceeds to step S2306. For example, if the section length t is set at 1 second, the speech style estimating unit 23 obtains the average power (representative feature quantity) as Dt from feature quantity Pi of 100 frames (N=100).

$$Dt = \Sigma Di/N \qquad (3)$$

In step S2306, the speech style estimating unit 23 substitutes the representative feature quantity Dt obtained in step S2305 into preset function f(Dt), compares the substitution result with the threshold value, and estimates the speech style. Then the speech style estimating unit 23 proceeds to step S2307. For example, if the function f(Dt) exceeds preset threshold value Tx, the speech style estimating unit 23 discriminates that the general speech is made in this section. On the other hand, if the function f(Dt) is equal to or greater than threshold value Ty(<Tx) and is smaller than Tx, the speech style estimating unit 23 discriminates that the speech is made with whisper in this section. In addition, if the function f(Dt) is smaller than the threshold value Ty, the speech style estimating unit 23 discriminates that conversation is not made (no speech) in this section.

In step S2307, the speech style estimating unit 23 notifies the conversion control unit 31 of the speech style obtained by the discrimination in step S2306. Then, the speech style estimating unit 23 proceeds to step S2308.

In step S2308, the speech style estimating unit 23 discriminates whether or not the input of the digital speech signal from the speech input unit 11 has been interrupted. If the input has been interrupted, the speech style estimating unit 23 ends the process. If the input has not been interrupted, the speech style estimating unit 23 proceeds to step S2301 to execute a process for a next frame.

As described above, the speech style estimating unit 23 repeats the estimation of the speech style in frame unit, and stops the process if the input of the digital speech signal is interrupted or restarts the process if the input is executed again.

As described above, in the speech converter 253, when the speech style is estimated, the difference between the strength in the spectrum component of the low band corresponding to the formant of the spectrum component that is the feature of whisper and the strength in the spectrum component of the band higher than the low band is detected, and the speech style is estimated on the basis of the detected difference. It is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner. Besides, the same advantage as that of the speech converter 251 of the first embodiment can be obtained, and the same modification can be made.

(Fourth Embodiment)

Figure 14:
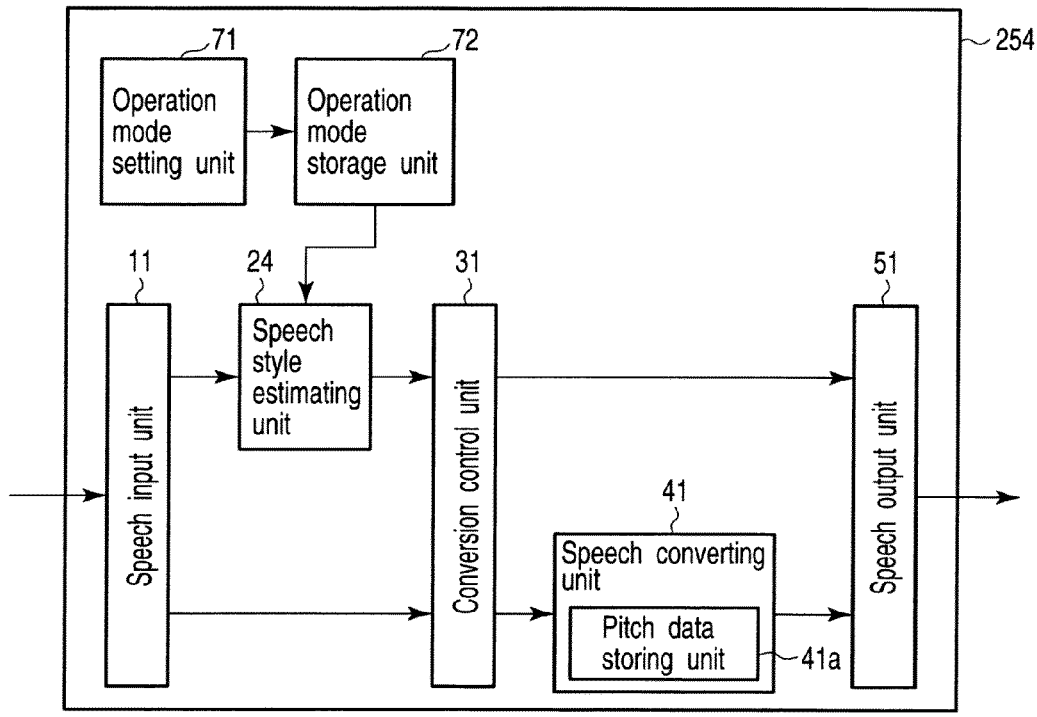
FIG. 14 shows a block diagram of a configuration of a speech converter.

Next, a speech converter 254 shown in FIG. 14 will be described as a fourth embodiment of the speech converter 250. The speech converter 254 comprises a speech input unit 11, a speech style estimating unit 24, a conversion control unit 31, a speech converting unit 41, a speech output unit 51, an operation mode setting unit 71 and an operation mode storing unit 72 as shown in FIG. 14.

The operation mode setting unit 71 comprises a key switch and the like to accept user's requests. By operating the key switch by the user, the operation mode setting unit 71 accepts the general conversation mode, manner mode in which no inconvenience to surroundings is caused, a driving mode which is set at driving a vehicle or the like, a meeting mode which is set during a meeting, or the like.

The manner mode is the operation mode in which ringing sounds are not generated even if an incoming call comes. The driving mode is the operation mode which notifies the caller that the user is driving a vehicle. In addition, the meeting mode is the operation mode in which the user is currently in a meeting.

Besides accepting the requests from the user, the operation mode setting unit 71 may comprise a GPS (Global Positioning System) receiver and automatically change the mode in accordance with position information detected by the GPS receiver.

The operation mode storing unit 72 stores identification information of the operation mode set by the operation mode setting unit 71.

The speech input unit 11 accepts the input of the digital speech signal from the AD conversion unit 240 of the prior stage, and outputs the digital speech signal to the speech style estimating unit 24 and the conversion control unit 31.

The speech style estimating unit 24 estimates the speech style in which the speech input from the speech input unit 11 has been made, on the basis of the operation mode stored in the operation mode storing unit 72. For example, in the general mode, the speech style estimating unit 24 discriminates the speech style of the general speech. In the manner mode, the speech style estimating unit 24 discriminates the speech style of whisper. The speech style estimated by the speech style estimating unit 24 is output to the conversion control unit 31. Details of the operation of the speech style estimating unit 24 will be described later.

The conversion control unit 31 buffers the digital speech signal input from the speech input unit 11, and determines whether the digital speech signal input from the speech input unit 11 should be output to the speech output unit 51 or the speech converting unit 41 on the basis of the speech style estimated by the speech style estimating unit 24.

Such speech conversion may not be executed by the speech converting unit 41 on the basis of the output of change according to the speech style, but the digital speech signal may be output to the speech converting unit 41 at any time and the speech converting unit 41 may dynamically change the method of speech conversion in accordance with the speech style. The details of the operation of the conversion control unit 31 are the same as those of the first embodiment described with reference to FIG. 6 and, therefore, are not described here.

The speech converting unit 41 comprises a pitch data storing unit 41a which stores pitch data. The pitch data storing unit 41a stores typical pitch components (frequency Ff and strength Sf) of the digital speech signal, and a speech waveform in association with each other. Then, the speech converting unit 41 executes a signal process by using the pitch data stored in the pitch data storing unit 41a such that a speech of the digital speech signal input via the conversion control unit 31 can easily be heard, converts the digital speech signal, and outputs the converted digital speech signal to the speech output unit 51. Details of the operation of the speech converting unit 41 are the same as those of the first embodiment described with reference to FIG. 7 and, therefore, are not described here.

The speech output unit 51 buffers the digital speech signal output from the conversion control unit 31 or the speech converting unit 41, and outputs the buffered digital speech signal to the speech encoding unit 260 of the subsequent stage. If the digital speech signal is output by changing the conversion control unit 31 to the speech converting unit 41 or the speech converting unit 41 to the conversion control unit 31, the digital speech signals are output from the units to the speech encoding unit 260 so as to be sequential.

Next, the operations of the units in the speech converter 254 according to the fourth embodiment will be described in detail.

Figure 15:
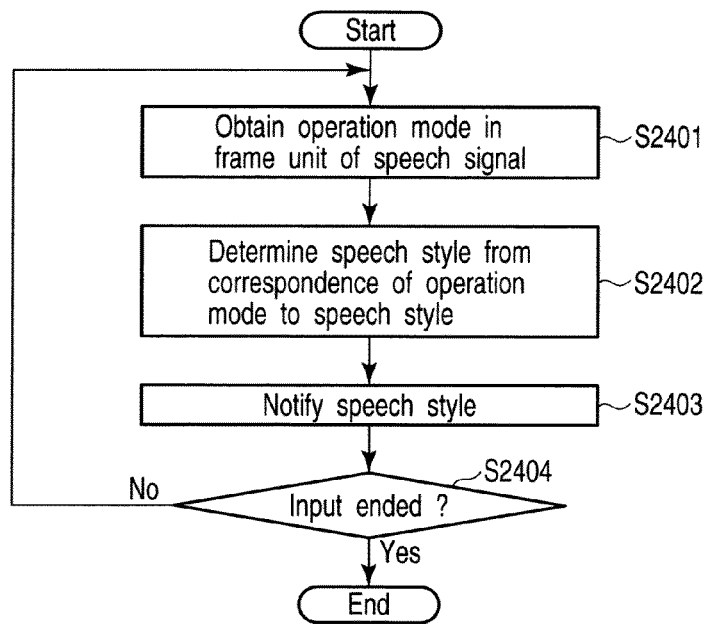
FIG. 15 shows a flowchart of operations of a speech style estimating unit.

The speech converter 254 of the fourth embodiment is different from the speech converter 251 of the first embodiment in terms of employing the speech style estimating unit 24 instead of the speech style estimating unit 21 employed in the speech converter 251 of the first embodiment and further comprising the operation mode setting unit 71 and the operation mode storing unit 72. Thus, the following descriptions are mainly focused on the speech style estimating unit 24, with reference to FIG. 15.

First, in step S2401, the speech style estimating unit 24 reads the identification information of the operation mode set in the operation mode storing unit 72, for each frame of the digital speech signal input from the speech input unit 11. Then, the speech style estimating unit 24 proceeds to step S2402.

Figures 16, 17:
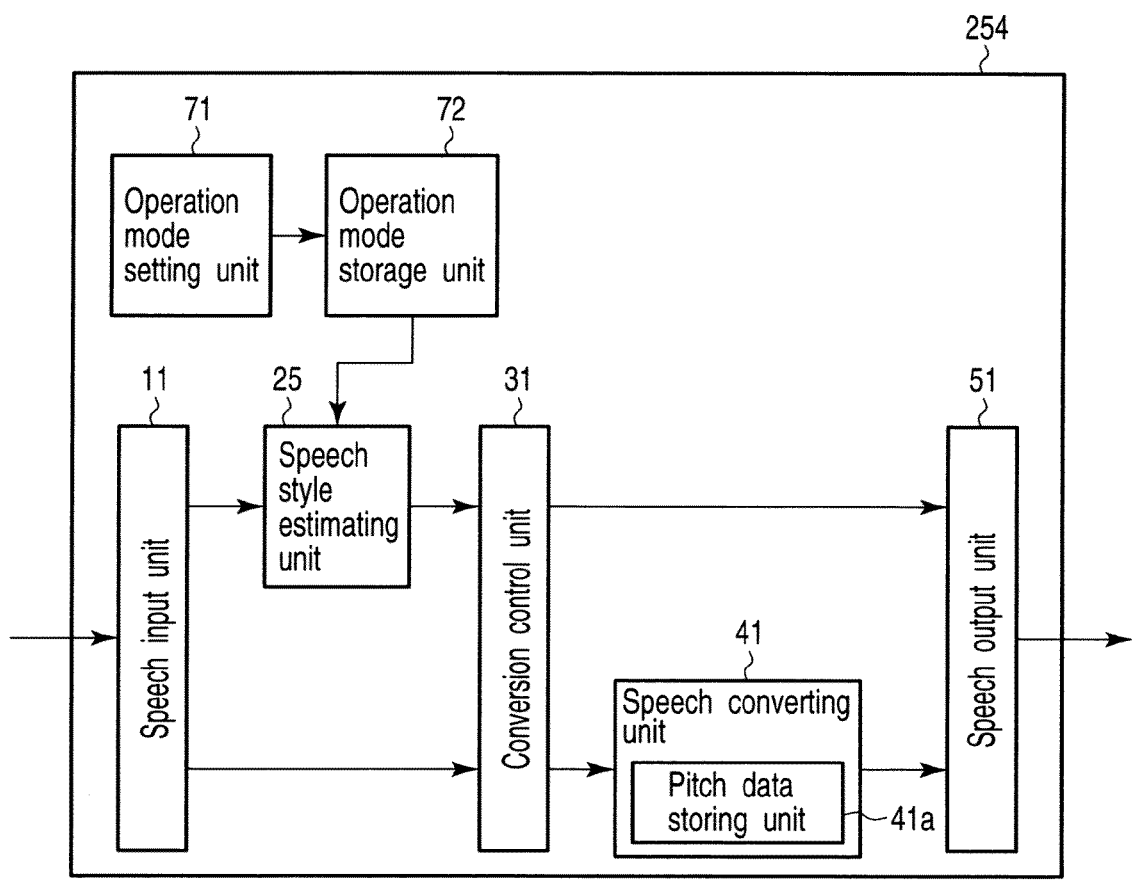
FIG. 16 shows a table stored in a speech style estimating unit.
FIG. 17 shows a block diagram of a configuration of a speech converter.

In step S2402, the speech style estimating unit 24 refers to a table shown in FIG. 16, and estimates the speech style in which the digital speech signal of the current frame is generated, by detecting the speech style corresponding to the identification information of the operation mode read in step S2401. Then, the speech style estimating unit 24 proceeds to step S2403. In the example shown in FIG. 16, speech style is estimated as whisper in the manner mode and the driving mode while it is estimated as the general speech in the general mode.

In step S2403, the speech style estimating unit 24 notifies the conversion control unit 31 of the speech style obtained from the discrimination in step S2402. Then, the speech style estimating unit 24 proceeds to step S2404.

In step S2404, the speech style estimating unit 24 discriminates whether or not the input of the digital speech signal from the speech input unit 11 has been interrupted. If the input has been interrupted, the speech style estimating unit 24 ends the process. If the input has not been interrupted, the speech style estimating unit 24 proceeds to step S2401 to execute a process for a next frame.

As described above, the speech style estimating unit 24 repeats the estimation of the speech style in frame unit, and stops the process if the input of the digital speech signal is interrupted or restarts the process if the input is executed again.

As described above, in the speech converter 254, the speech style is estimated in the operation mode of the mobile radio terminal. It is automatically discriminated whether or not the speech input on the basis of the estimated speech style can hardly be heard at the time of outputting the speech and, if the speech can hardly be heard, the pitch components are added to the speech such that the speech is converted into speech which can easily be heard.

Therefore, if the user changes the operation mode in accordance with change in speaking environment, the speech conversion is automatically executed as needed and the speech which can easily be heard is output at the reproduction. For this reason, for example, when the user changes the operation mode during conversation using the cellular telephone, the user can seamlessly continue speaking without giving an uncomfortable feeling to the conversation partner. Besides, the same advantage as that of the speech converter 251 of the first embodiment can be obtained, and the same modification can be made.

(Fifth Embodiment)

Next, a speech converter 255 shown in FIG. 17 will be described as a fifth embodiment of the speech converter 250. The speech converter 255 comprises a speech input unit 11, a speech style estimating unit 25, a conversion control unit 31, a speech converting unit 41, a speech output unit 51, an operation mode setting unit 71 and an operation mode storing unit 72 as shown in FIG. 17.

The operation mode setting unit 71 comprises a key switch and the like to accept user's requests. By operating the key switch by the user, the operation mode setting unit 71 accepts the general conversation mode, manner mode in which no inconvenience to surroundings is caused, a driving mode which is set at driving a vehicle or the like, a meeting mode which is set during a meeting, or the like.

Besides accepting the requests from the user, the operation mode setting unit 71 may comprise a GPS (Global Positioning System) receiver and automatically change the mode in accordance with position information detected by the GPS receiver.

The operation mode storing unit 72 stores identification information of the operation mode set by the operation mode setting unit 71.

The speech input unit 11 accepts the input of the digital speech signal from the AD conversion unit 240 of the prior stage, and outputs the digital speech signal to the speech style estimating unit 25 and the conversion control unit 31.

The speech style estimating unit 25 estimates the speech style in which the speech input from the speech input unit 11 has been made, on the basis of the operation mode stored in the operation mode storing unit 72. For example, in the general mode, the speech style estimating unit 25 discriminates the speech style of the general speech. In the manner mode, the speech style estimating unit 25 discriminates the speech style of whisper. The speech style estimated by the speech style estimating unit 25 is output to the conversion control unit 31. Details of the operation of the speech style estimating unit 25 will be described later.

The conversion control unit 31 buffers the digital speech signal input from the speech input unit 11, and determines whether the digital speech signal input from the speech input unit 11 should be output to the speech output unit 51 or the speech converting unit 41 on the basis of the speech style estimated by the speech style estimating unit 25.

Such speech conversion may not be executed by the speech converting unit 41 on the basis of the output of change according to the speech style, but the digital speech signal may be output to the speech converting unit 41 at any time and the speech converting unit 41 may dynamically change the method of speech conversion in accordance with the speech style. The details of the operation of the conversion control unit 31 are the same as those of the first embodiment described with reference to FIG. 6 and, therefore, are not described here.

The speech converting unit 41 comprises a pitch data storing unit 41a which stores pitch data. The pitch data storing unit 41a stores typical pitch components (frequency Ff and strength Sf) of the digital speech signal, and a speech waveform in association with each other. Then, the speech converting unit 41 executes a signal process by using the pitch data stored in the pitch data storing unit 41a such that a speech of the digital speech signal input via the conversion control unit 31 can easily be heard, converts the digital speech signal, and outputs the converted digital speech signal to the speech output unit 51. Details of the operation of the speech converting unit 41 are the same as those of the first embodiment described with reference to FIG. 7 and, therefore, are not described here.

The speech output unit 51 buffers the digital speech signal output from the conversion control unit 31 or the speech converting unit 41, and outputs the buffered digital speech signal to the speech encoding unit 260 of the subsequent stage. If the digital speech signal is output by changing the conversion control unit 31 to the speech converting unit 41 or the speech converting unit 41 to the conversion control unit 31, the digital speech signals are output from the units to the speech encoding unit 260 so as to be sequential.

Next, the operations of the units in the speech converter 255 according to the fifth embodiment will be described in detail.

Figure 18:
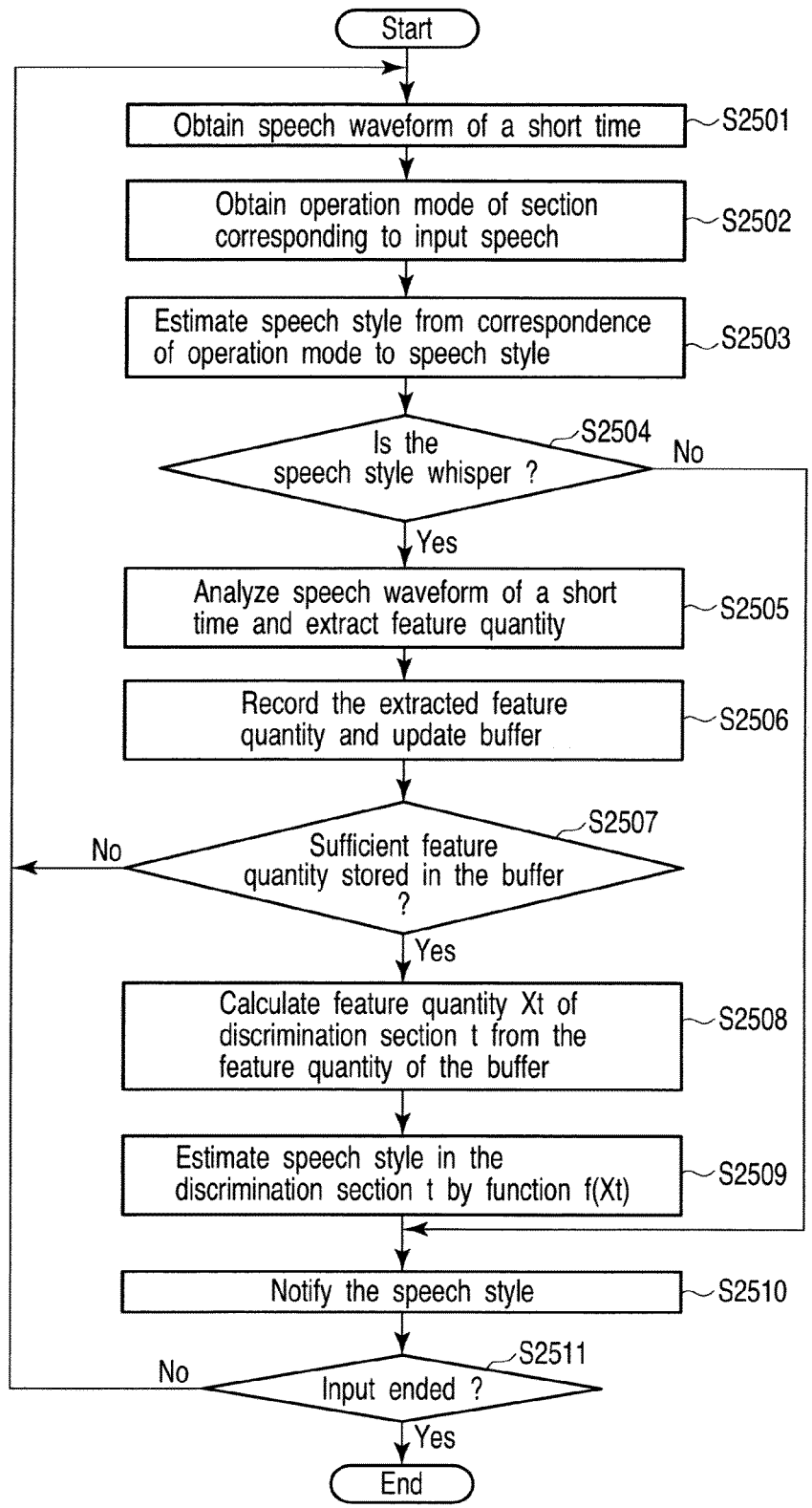
FIG. 18 shows a flowchart of operations of a speech style estimating unit.

The speech converter 255 of the fifth embodiment is different from the speech converter 251 of the first embodiment in terms of employing the speech style estimating unit 25 instead of the speech style estimating unit 21 employed in the speech converter 251 of the first embodiment and comprising the operation mode setting unit 71 and the operation mode storing unit 72. Thus, the following descriptions are mainly focused on the speech style estimating unit 25, with reference to FIG. 18.

First, in step S2501, the speech style estimating unit 25 cuts out of the digital speech signal input from the speech input unit 11, the speech data included therein, in terms of frame length F1 and frame shift Fs. Then, the speech style estimating unit 25 proceeds to step S2502. The frame is a basic unit in the estimating process of the speech style and the converting process of the speech converting unit 41. For example, frame length F1 can be set at 25 ms and frame shift Fs can be set at 10 ms. For this reason, the speech data cut out in each frame has a portion overlapping between adjacent frames.

In steps S2502, the speech style estimating unit 25 reads the identification information of the operation mode set by the operation mode setting unit 72, for each frame of the digital speech signal input from the speech input unit 11, from the operation mode storing unit 72. The speech style estimating unit 25 proceeds to step S2503.

Figures 19, 20:
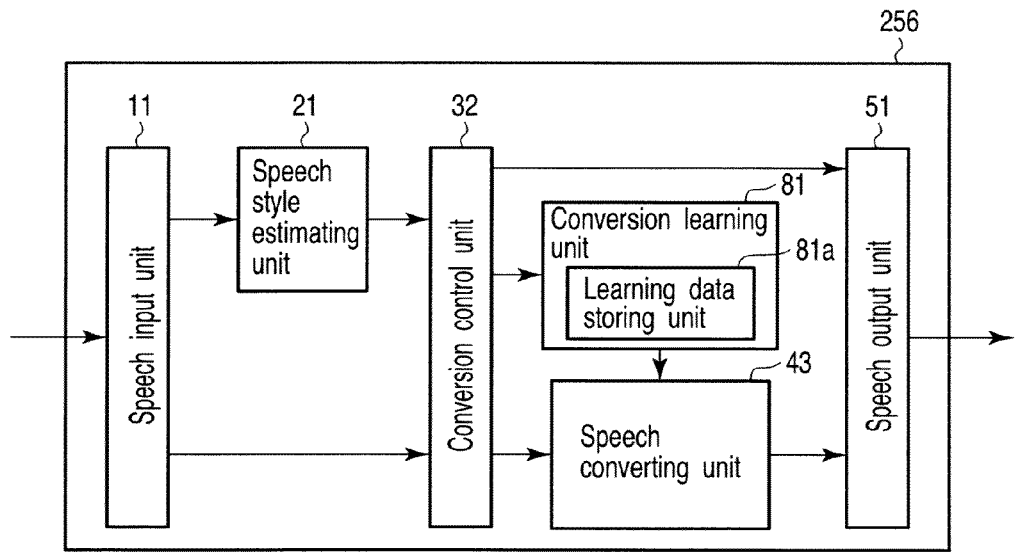
FIG. 19 shows a table stored in a speech style estimating unit.
FIG. 20 shows a block diagram of a configuration of a speech converter.

In step S2503, the speech style estimating unit 25 estimates the speech style in which the digital speech signal of the current frame is output, by detecting the speech style corresponding to the identification information of the operation mode read in step S2501, with reference to a table as shown in FIG. 19. Then, the speech style estimating unit 25 proceeds to step S2504. In the example shown in FIG. 19, the speech style is estimated as whisper in the manner mode and the driving mode while it is not estimated as a specific style in the general mode.

In step S2504, the speech style estimating unit 25 discriminates whether or not the speech style has been estimated as whisper in step S2503. If the speech style estimating unit 25 discriminates that the speech style has been estimated as whisper, the speech style estimating unit 25 proceeds to step S2510. If the speech style estimating unit 25 discriminates that the speech style has not been estimated as whisper, the speech style estimating unit 25 proceeds to step S2505.

In step S2505, the speech style estimating unit 25 analyzes the speech data cut out in step S2501, for each frame, and thereby extracts the feature data in each frame. The speech style estimating unit 25 proceeds to step S2506. In this embodiment, since the speech style estimating unit 25 estimates the speech style in accordance with the volume of speech, the speech style estimating unit 25 extract a power spectrum from the speech data by, for example, Fast Fourier Transform (FFT), and calculates the feature quantity in each frame by calculating power Pi (i represents a frame number) from the power spectrum.

In step S2506, the speech style estimating unit 25 stores the feature quantity in frame unit calculated in step S2505. The speech style estimating unit 25 proceeds to step S2507. The buffer is provided in the speech style estimating unit 25 and is capable of storing the feature quantity in a plurality of frames corresponding to, for example, at least 1 second. By comprising the buffer, the speech style estimating unit 25 can discriminate the speech style from the pitch components of a plurality of frames, and can discriminate the speech style more stably than the discrimination from the pitch components of one frame. In step S2506, too, the speech style estimating unit 25 overwrites the memory area such that only new feature quantity needed for discrimination of the subsequent stage remains, to efficiently use the memory area of the buffer.

In step S2507, the speech style estimating unit 25 discriminates whether the feature quantity of a section length (for example, 1 second) needed for discrimination is stored in the buffer. For example, if the leading section of the digital speech signal is processed, the feature quantity of a sufficient section length is not stored in the buffer and, therefore, the speech style estimating unit 25 proceeds to step S2501 to obtain the speech waveform of a next frame. If the feature quantity of a sufficient section length is stored in the buffer, the speech style estimating unit 25 proceeds to step S2508.

In step S2508, the speech style estimating unit 25 obtains representative feature quantity Xt of section length t. For example, the speech style estimating unit 25 obtains an average power from the formula (1) as the representative feature quantity Dt and then proceeds to step S2509. For example, if the section length t is set at 1 second, the speech style estimating unit 25 obtains the average power (representative feature quantity) as Xt from feature quantity Pi of 100 frames (N=100).

In step S2509, the speech style estimating unit 25 substitutes the representative feature quantity Xt obtained in step S2505 into preset function f(Xt), compares the substitution result with the threshold value, and estimates the speech style. Then the speech style estimating unit 25 proceeds to step S2510. For example, if the function f(Xt) exceeds preset threshold value Tx, the speech style estimating unit 25 discriminates that the general speech is made in this section. On the other hand, if the function f(Xt) is equal to or greater than threshold value Ty (<Tx) and is smaller than Tx, the speech style estimating unit 25 discriminates that the speech is made with whisper in this section. In addition, if the function f(Xt) is smaller than the threshold value Ty, the speech style estimating unit 25 discriminates that conversation is not made (no speech) in this section.

In step S2510, the speech style estimating unit 25 notifies the conversion control unit 31 of the speech style obtained by the discrimination in step S2509. Then, the speech style estimating unit 25 proceeds to step S2511.

In step S2511, the speech style estimating unit 25 discriminates whether or not the input of the digital speech signal from the speech input unit 11 has been interrupted. If the input has been interrupted, the speech style estimating unit 25 ends the process. If the input has not been interrupted, the speech style estimating unit 25 proceeds to step S2501 to execute a process for a next frame.

As described above, the speech style estimating unit 25 repeats the estimation of the speech style in frame unit, and stops the process if the input of the digital speech signal is interrupted or restarts the process if the input is executed again.

As described above, in the speech converter 255, when the speech style is estimated, the operation mode of the mobile radio terminal and a result of analysis of the speech are used together. It is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, if the user changes the speech style in accordance with change in speaking environment, the speech conversion is automatically executed as needed without special operations, and the speech which can easily be heard is output at the reproduction. For this reason, for example, if the user suddenly speaks with whisper or changes whisper to the general speech style during conversation using the cellular telephone, the user can seamlessly continue speaking without giving an uncomfortable feeling to the conversation partner.

Furthermore, the speech style is estimated in accordance with the operation mode. Since the estimation of the speech style based on the speech analysis is executed in an only case where the speech style is not discriminated as whisper, the calculation amount based on the speech analysis can be restricted. Besides, the same advantage as that of the speech converter 251 of the first embodiment can be obtained, and the same modification can be made.

(Sixth Embodiment)

Next, a speech converter 256 shown in FIG. 20 will be described as a sixth embodiment of the speech converter 250. The speech converter 256 comprises a speech input unit 11, a speech style estimating unit 21, a conversion control unit 32, a speech converting unit 43, a speech output unit 51, and a conversion learning unit 81 as shown in FIG. 20.

The speech input unit 11 accepts an input of the digital speech signal from the AD conversion unit 240 of the prior stage, and outputs the digital speech signal to the speech style estimating unit 21 and the conversion control unit 32.

The speech style estimating unit 21 analyzes the digital speech signal input from the speech input unit 11 and estimates the speech style in which the speech input from the speech input unit 11 has been made, on the basis of the analysis result. The speech style estimated by the speech style estimating unit 21 is output to the conversion control unit 32. Details of the operation of the speech style estimating unit 21 are the same as those of the first embodiment described with reference to FIG. 4 and, therefore, are not described here.

The conversion control unit 32 buffers the digital speech signal input from the speech input unit 11, and selectively outputs the digital speech signal input from the speech input unit 11 to the speech output unit 51, conversion learning unit 81 or speech converting unit 43 on the basis of the speech style estimated by the speech style estimating unit 21.

Such speech conversion may not be executed by the speech converting unit 43 on the basis of the output of change according to the speech style, but the digital speech signal may be output to the speech converting unit 43 at any time and the speech converting unit 43 may dynamically change the method of speech conversion in accordance with the speech style. Details of the operation of the conversion control unit 32 will be described later.

The conversion learning unit 81 comprises a learning data storing unit 81a. The conversion learning unit 81 analyzes the digital speech signal output from the conversion control unit 32, extracts and learns information which is needed when the speech converting unit 43 converts the speech, and stores the data in the learning data storing unit 81a. Details of the operation of the conversion learning unit 81 will be described later.

The speech converting unit 43 executes a signal process by using the learning data stored in the learning data storing unit 81a such a speech of that the digital speech signal input via the conversion control unit 32 can easily be heard, converts the digital speech signal, and outputs the converted digital speech signal to the speech output unit 51. Details of the operation of the speech converting unit 43 will be described later.

The speech output unit 51 buffers the digital speech signal output from the conversion control unit 32 or the speech converting unit 43, and outputs the buffered digital speech signal to the speech encoding unit 260 of the subsequent stage. If the digital speech signal is output by changing the conversion control unit 32 to the speech converting unit 43 or the speech converting unit 43 to the conversion control unit 32, the digital speech signals are output from the units to the speech encoding unit 260 so as to be sequential.

Next, the operations of the units in the speech converter 256 according to the sixth embodiment will be described in detail.

First, details of the operation of the conversion control unit 32 will be described with reference to a flowchart of FIG. 21. As described above, the conversion control unit 32 controls the operations of the conversion learning unit 81 and speech converting unit 43 at the subsequent stage in a case where the speech style is discriminated as whisper or other cases.

In step S3201, the conversion control unit 32 obtains the speech style estimated by the speech style estimating unit 21. Then, the conversion control unit 31 proceeds to step S3202. In this embodiment, three types of speech, i.e. whisper, general speech and no speech are discriminated by the speech style estimating unit 21 as described above, and a result of the discrimination is input.

In step S3202, the conversion control unit 32 discriminates whether or nor a process of converting the digital speech signal by the speech converting unit 41 is required, on the basis of the speech style obtained in step S3201. If the speech style is whisper, the conversion control unit 32 discriminates that the converting process is required, and proceeds to step S3203. If the speech style is general speech or no speech, the conversion control unit 32 discriminates that the converting process is not required, and proceeds to step S3204.

In step S3203, the conversion control unit 32 outputs to the speech converting unit 41 the digital speech signals in the frame in which the speech style is discriminated as whisper by the speech style estimating unit 22 and frames of predetermined sections before and after the frame. The conversion control unit 31 proceeds to step S3205.

In step S3204, the conversion control unit 32 outputs to the speech output unit 51 the digital speech signal in the frame in which the speech style is discriminated as general speech or no speech by the speech style estimating unit 22. The conversion control unit 31 proceeds to step S3105.

In step S3205, the conversion control unit 32 discriminates whether or not a learning process can be executed by the conversion learning unit 81, on the basis of the speech style obtained in step S3201. If the speech style is the general speech, the conversion control unit 32 discriminates that the learning process can be executed, and proceeds to step S3206.

If the speech style is whisper or no speech, the conversion control unit 32 discriminates that the learning process cannot be executed, and proceeds to step S3207.

In step S3206, the conversion control unit 32 outputs to the conversion learning unit 81 the digital speech signals in the frame in which the speech style is discriminated as the general speech by the speech style estimating unit 22 and frames of predetermined sections before and after the frame. The conversion control unit 32 proceeds to step S3207.

In step S3207, the conversion control unit 32 discriminates whether or not the input of the digital speech signal from the speech input unit 11 has been interrupted. If the input has been interrupted, the conversion control unit 32 ends this process. On the other hand, if the input has not been interrupted, the conversion control unit 32 returns to step S3201 and executes the process of a next frame.

Next, details of the operation of the conversion learning unit 81 will be described with reference to a flowchart of FIG. 22. The conversion learning unit 81 inputs the digital speech signal and executes the learning process in a case where the speech style is the general speech and learning can be executed as described in the flowchart of FIG. 21.

First, in S8101, the conversion learning unit 81 obtains the digital speech signals in the frame in which whisper is discriminated by the speech style estimating unit 21 and the frames in predetermined sections before and after the frame, from the digital speech signal input from the conversion control unit 32, and cuts out the speech data in frame length F1 and frame shift Fs from the digital speech signals. Then, the conversion learning unit 81 proceeds to step S8102. The frame length and the frame shift may be the same as those of the speech style estimating unit 21.

In step S8102, the conversion learning unit 81 analyzes a speech waveform of a short time by analyzing the speech data cut out in step S8101 for each frame, and thereby extracts the pitch components (frequency Ff and strength Sf) for each frame as the feature quantity. Then, the conversion learning unit 81 proceeds to step S8103.

As the method of extracting the pitch components, any existing methods such as a method of extracting them from an auto-correlation function of the residual component from which a spectrum envelope component is removed, an extraction method focusing on a repetitive pattern of zero-cross number, a pitch extracting method based on an auto-correlation function of a speech waveform, and the like, as described in the previous embodiment, can be applied.

In step S8103, the conversion learning unit 81 discriminates whether or not the pitch components extracted in step S8102 can be used for learning. There is the speech data for each frame including the voiced sounds in which the pitch components are strongly expressed, and the other data including unvoiced sounds in which the pitch components are hardly observed. For this reason, a learning section is selected to remove a bad influence resulting from using the unvoiced sound part for learning.

As the concrete method of discrimination, for example, the auto-correlation function is applied to the speech data for each frame and then a correlation value is obtained. If the correlation value is beyond a preset threshold value, the conversion learning unit 81 discriminates that the pitch components are suitable for learning to indicate that the pitch components are strongly represented in the speech data. If the correlation value is equal to or smaller than a preset threshold value, the conversion learning unit 81 discriminates that the pitch components are unsuitable for learning to indicate that the pitch components are not strongly represented in the speech data. If the pitch components are suitable for learning, the conversion learning unit 81 proceeds to step S8104. If the pitch components are unsuitable for learning, the conversion learning unit 81 proceeds to step S8105.

In step S8104, the conversion learning unit 81 generates learning data based on the pitch components extracted in step S8102 and records the generated learning data in the learning data storing unit 81a. Then, the conversion learning unit 81 proceeds to step S8105. Various methods can be conceived as the method of generating the learning data based on the pitch components. For example, if an average value of the pitch components is recorded in the conversion learning unit 81 as the leaning data, the following formula (4) is employed. In other words, average value Ppav of the pitch components recorded in the learning data storing unit 81a by previous learning and previous learning count N may be recorded and new pitch components may be updated with pitch components Pnew of new learning.

$$P n \text{av} = (P p \text{av} * N + P \text{new})/(N+1);$$

$$N = N+1; \qquad (4)$$

In step S8105, the conversion learning unit 81 discriminates whether or not the input of the digital speech signal from the speech input unit 11 has been interrupted. If the input of the digital speech signal has been interrupted, the conversion learning unit 81 ends this process. If the input of the digital speech signal has not been interrupted, the conversion learning unit 81 proceeds to step S8101 to execute the process for a next frame.

Figure 23:
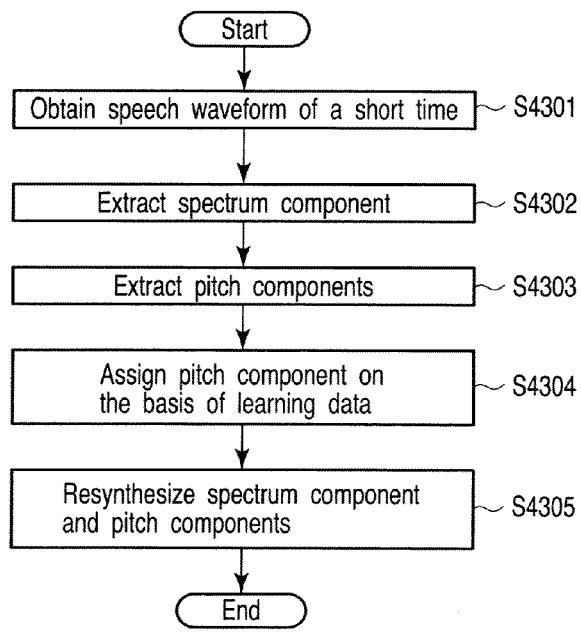
FIG. 23 shows a flowchart of operations of a speech converting unit.

Next, details of the operation of the speech converting unit 43 will be described with reference to a flowchart of FIG. 23. When the speech style is discriminated as whisper as described above, the speech converting unit 43 inputs the digital speech signal from the conversion control unit 32 and executes a process shown in FIG. 23 for each frame. In this example, the input speech is converted into speech which can easily be heard by adding the pitch component learnt by the conversion learning unit 81 to the input digital speech signal.

In S4301, the speech converting unit 43 obtains the digital speech signals in the frame in which whisper is discriminated by the speech style estimating unit 21 and the frames in predetermined sections before and after the frame, from the digital speech signal input from the conversion control unit 32, and cuts out the speech data in frame length F1 and frame shift Fs from the digital speech signals. Then, the speech converting unit 43 proceeds to step S4302. The frame length and the frame shift may be the same as those of the speech style estimating unit 21.

In step S4302, the speech converting unit 43 analyzes a speech waveform of a short time by analyzing the speech data cut out in step S4301 for each frame, and thereby extracts a spectrum component for each frame. Then, the speech converting unit 43 proceeds to step S4303. As the analyzing method, for example, linear prediction analysis (LPC) can be employed. The spectrum component may be expressed by extracted linear prediction coefficient $\alpha i$ (i=1, 2, . . . , N: N represents an analysis dimension).

In step S4303, the speech converting unit 43 analyzes the speech waveform of a short time by analyzing the speech data cut out in step S4301 for each frame, and thereby extracts pitch components (frequency and strength) of each frame. Then, the speech converting unit 41 proceeds to step S4304. As the method of extracting the pitch components, for example, a method of calculating predictive residual signal ri (i=1, 2, . . . , N: N represents an analysis dimension) from which the spectrum component extracted from the speech waveform in step S4302 is removed, by using the speech waveform and the linear prediction (LPC) coefficient $\alpha i$ and obtaining frequency Ff and strength Sf of the pitch components from an auto-correlation function of the predictive residual signal ri can be employed.

In step S4304, the speech converting unit 43 reads the speech waveform corresponding to the pitch component (frequency Ff) extracted in step S4303 from the learning data storing unit 81a, and urges a voiced source signal to be generated on the basis of the speech waveform. For example, the speech converting unit 43 generates a voiced source signal by repeatedly generating simple pulse signals in accordance with the read pitch cycle, adds the generated voiced source signal to the predictive residual signal and thereby urges a voiced source signal to be generated. Then, the speech converting unit 43 proceeds to step S4305. In this embodiment, the learning data storing unit 81a is provided. As for the speech waveform corresponding to the pitch component which is not stored in, i.e. not learnt by the learning data storing unit 81a, the simple pulse signals may be repeatedly generated in accordance with the pitch cycle obtained in step S4303 and may be added to the speech data of the corresponding frame.

In step S4305, the speech converting unit 43 synthesizes the predictive residual signal (ri) to which the pitch components are assigned in step S4304 and the linear prediction coefficient (αi) extracted as the spectrum component in step S4303 by urging them to pass through a synthesis filter. The speech converting unit 43 thereby obtains the speech data having listenability improved by assigning the pitch component. The speech converting unit 43 outputs the speech data to the speech output unit 51 and ends this process. If a next frame is present, the speech converting unit 43 executes the process shown in FIG. 23 for the next frame.

As described above, in the speech converter 256, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, since the speech converter 256 executes speech conversion in the speech section in which conversion needs to be executed on the basis of the estimated speech style, the speech converter 251 can restrict the speech conversion from being erroneously executed and the speech which cannot easily be heard from being generated. The speech converter 251 also has an effect of restricting the calculation for the section in which the conversion is unnecessary.

Furthermore, the speech converter 256 extracts and learns the pitch component when the speech style is the general speech and then adds the pitch component to the speech on the basis of the learnt data to convert the speech such the speech can easily be heard when the speech style is whisper. Therefore, the information necessary for the speech conversion does not need to be prepared and the convenience is increased. Besides, the same advantage as that of the first embodiment can be obtained, and the same modification can be made.

(Seventh Embodiment)

Figure 24:
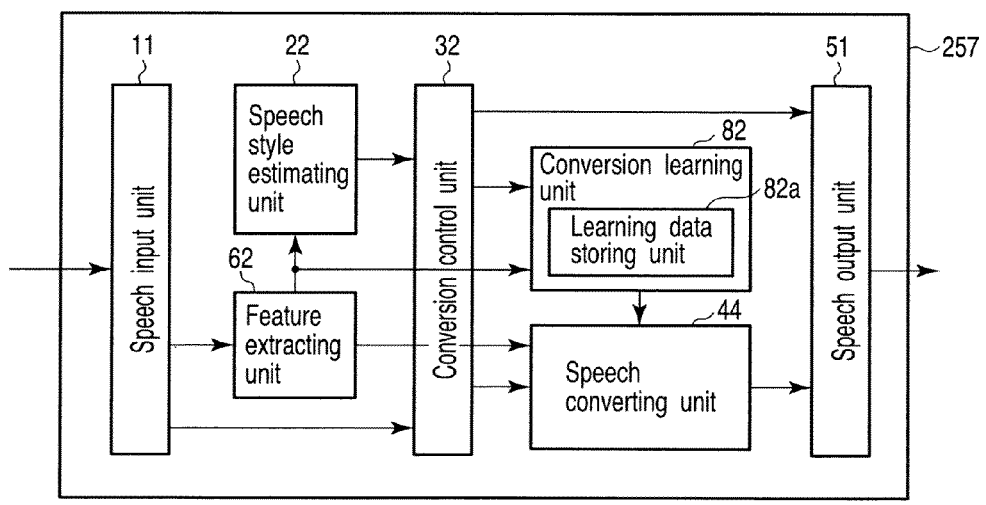
FIG. 24 shows a block diagram of a configuration of a speech converter.

Next, a speech converter 257 shown in FIG. 24 will be described as a seventh embodiment of the speech converter 250. The speech converter 257 comprises a speech input unit 11, a speech style estimating unit 22, a conversion control unit 32, a speech converting unit 44, a speech output unit 51, a characteristic extracting unit 62 and a conversion learning unit 82 as shown in FIG. 24.

The speech input unit 11 accepts an input of the digital speech signal from the AD conversion unit 240 of the prior stage, and outputs the digital speech signal to the conversion control unit 32 and the characteristic extracting unit 62.

The characteristic extracting unit 62 extracts a spectrum component of the digital speech signal, and extracts a predictive residual signal ri (i=1, 2, . . . , N: N represents an analysis dimension) and pitch components (frequency Ff and strength Sf) for each frame as a feature quantity of the digital speech signal, on the basis of the linear prediction (LPC) coefficient αi which is the spectrum component.

The extracted pitch components are output to not only the speech style estimating unit 22, but also the speech converting unit 44 since the extracted pitch components can also be applied to a converting process in the speech converting unit 44. Thus, duplication of the process of extracting the pitch components can be avoided and the process can be executed efficiently by sharing the pitch components by the speech style estimating unit 22, the speech converting unit 42 and the conversion learning unit 82. In addition, the predictive residual signal ri and the linear prediction coefficient αi are output to the speech converting unit 44, and the extraction of the signal can also be processed efficiently. Details of the operation of the characteristic extracting unit 62 will be described later.

The speech style estimating unit 22 analyzes the pitch components extracted by the characteristic extracting unit 62, and estimates the speech style in which the input speech has been made, on the basis of the result of analysis. Details of the operation of the speech style estimating unit 22 are the same as those of the second embodiment described with reference to FIG. 10 and, therefore, are not described here.

The conversion control unit 32 buffers the digital speech signal input from the speech input unit 11, and selectively outputs the digital speech signal input from the speech input unit 11 to the speech output unit 51, conversion learning unit 82 or speech converting unit 44 on the basis of the speech style estimated by the speech style estimating unit 22.

Such speech conversion may not be executed by the speech converting unit 44 on the basis of the output of change according to the speech style, but the digital speech signal may be output to the speech converting unit 44 at any time and the speech converting unit 44 may dynamically change the method of speech conversion in accordance with the speech style. Details of the operation of the conversion control unit 32 are the same as those of the sixth embodiment described with reference to FIG. 21 and, therefore, are not described here.

The conversion learning unit 82 comprises a learning data storing unit 82a. When the conversion learning unit 82 inputs the digital speech signal from the conversion control unit 32 (i.e. when the speech style can be learnt as the general speech), the conversion learning unit 82 learns the pitch component output from the characteristic extracting unit 62 as information which is needed when the speech converting unit 43 converts the speech, and stores the learnt data in the learning data storing unit 82a. Details of the operation of the conversion learning unit 82 will be described later.

The speech converting unit 44 executes a signal process by using the pitch components and spectrum component extracted by the characteristic extracting unit 62 and the learning data stored in the learning data storing unit 82a such that a speech of the digital speech signal input via the conversion control unit 32 can easily be heard, converts the digital speech signal, and outputs the converted digital speech signal to the speech output unit 51. Details of the operation of the speech converting unit 44 will be described later.

The speech output unit 51 buffers the digital speech signal output from the conversion control unit 32 or the speech converting unit 44, and outputs the buffered digital speech signal to the speech encoding unit 260 of the subsequent stage. If the digital speech signal is output by changing the conversion control unit 32 to the speech converting unit 44 or the speech converting unit 44 to the conversion control unit 32, the digital speech signals are output from the units to the speech encoding unit 260 so as to be sequential.

Figure 25:
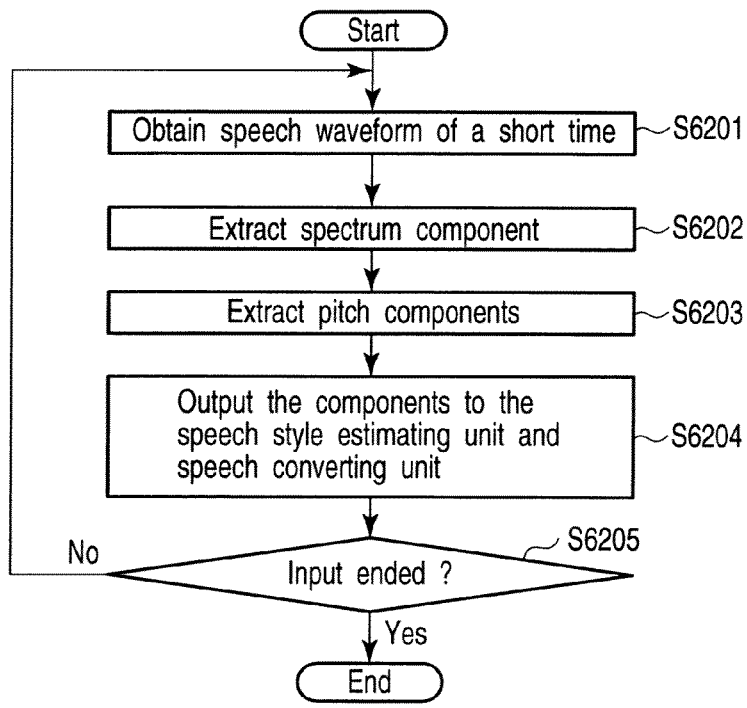
FIG. 25 shows a flowchart of operations of a feature extracting unit.

Next, the operations of the units in the speech converter 257 according to the seventh embodiment will be described in detail. First, details of the operation of the characteristic extracting unit 62 will be described with reference to a flowchart of FIG. 25.

First, in S6201, the characteristic extracting unit 62 cuts out the speech data from the digital speech signal input from the speech input unit 11, in frame length F1 and frame shift Fs. Then, the characteristic extracting unit 62 proceeds to step S6202. The frame is a basic unit in the estimating process of the speech style of the speech style estimating unit 22 and the converting process of the speech converting unit 44. For example, frame length F1 can be set at 25 ms and frame shift Fs can be set at 10 ms. For this reason, the speech data cut out in each frame has a portion overlapping between adjacent frames. The frame length and the frame shift may be the same as those of the speech style estimating unit 21 of the first embodiment.

In step S6202, the characteristic extracting unit 62 analyzes a speech waveform of a short time by analyzing the speech data cut out in step S6201 for each frame, and thereby extracts the spectrum component for each frame. Then, the characteristic extracting unit 62 proceeds to step S6203. As the analyzing method, for example, linear prediction analysis (LPC) can be employed. The spectrum component may be expressed by extracted linear prediction coefficient $\alpha i$ ($i=1, 2, \ldots, N$: N represents an analysis dimension).

In step S6203, the characteristic extracting unit 62 analyzes the speech waveform of a short time by analyzing the speech data cut out in step S6201 for each frame, and thereby extracts pitch components (frequency Ff and strength Sf) of each frame. Then, the characteristic extracting unit 62 proceeds to step S6204. As the method of extracting the pitch components, for example, a method of calculating predictive residual signal $ri$ ($i=1, 2, \ldots, N$: N represents an analysis dimension) from which the spectrum component extracted from the speech waveform in step S6202 is removed, by using the speech waveform and the linear prediction (LPC) coefficient $\alpha i$ and obtaining frequency Ff and strength Sf of the pitch components from an auto-correlation function of the predictive residual signal $ri$ can be employed.

In step S6204, the characteristic extracting unit 62 outputs the pitch components extracted in step S6203 to the speech style estimating unit 22, the speech converting unit 44, and the conversion learning unit 82. In addition, the characteristic extracting unit 62 outputs the predictive residual signal $ri$ calculated at the time of obtaining the pitch components in step S6203 and the linear prediction coefficient $\alpha i$ that corresponds to the spectrum component extracted in step S6202, to the speech converting unit 44.

In step S6205, the characteristic extracting unit 62 discriminates whether or not the input of the digital speech signal from the speech input unit 11 is interrupted. If the input of the digital speech signal is interrupted, the characteristic extracting unit 62 ends this process. If the input of the digital speech signal is not interrupted, the characteristic extracting unit 62 proceeds to step S6201 to extract the spectrum component and the pitch components for a next frame.

Figure 26:
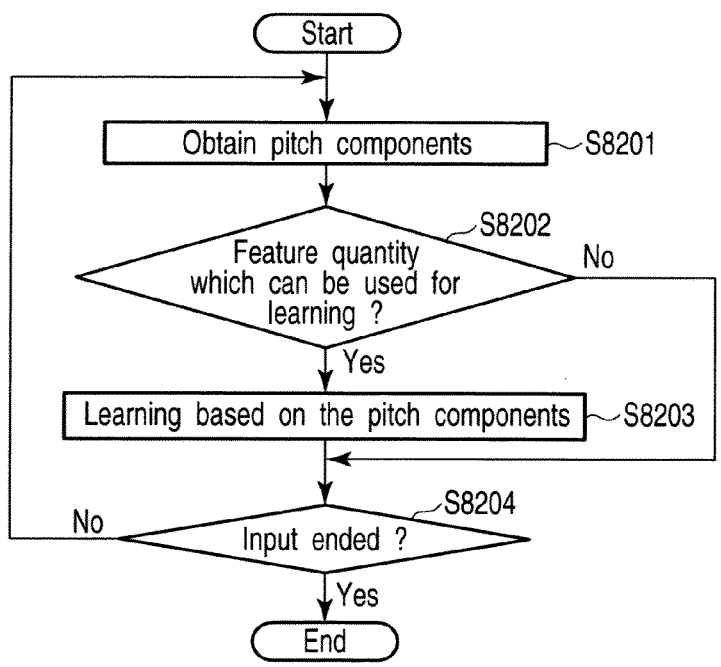
FIG. 26 shows a flowchart of operations of a conversion learning unit.

Next, details of the operation of the conversion learning unit 82 will be described with reference to a flowchart of FIG. 26. The conversion learning unit 82 inputs the digital speech signal and executes the learning process when the speech style is the general speech and learning can be executed as described in the flowchart of FIG. 21.

First, in S8201, the conversion learning unit 82 obtains the pitch components from the characteristic extracting unit 62 when the digital speech signal is input from the conversion control unit 32 simultaneously with the discrimination that the speech style is the general speech. Then, the conversion learning unit 82 proceeds to step S8202.

In step S8202, the conversion learning unit 82 discriminates whether the pitch components obtained in step S8201 can be utilized for learning. Some speech data items for each frame include the voiced sounds in which the pitch components are strongly expressed and the others include the unvoiced sounds in which the pitch components are rarely observed. For this reason, the learning section is selected to remove a bad influence caused by using the unvoiced sound portion for learning.

As the concrete method of discrimination, for example, the auto-correlation function is applied to the speech data for each frame and then a correlation value is obtained. If the correlation value is beyond a preset threshold value, the conversion learning unit 82 discriminates that the pitch components are suitable for learning to indicate that the pitch components are strongly represented in the speech data. If the correlation value is equal to or smaller than a preset threshold value, the conversion learning unit 82 discriminates that the pitch components are unsuitable for learning to indicate that the pitch components are not strongly represented. If the pitch components are suitable for learning, the conversion learning unit 82 proceeds to step S8203. If the pitch components are unsuitable for learning, the conversion learning unit 82 proceeds to step S8204.

In step S8203, the conversion learning unit 82 generates learning data based on the pitch components obtained in step S8201 and records the generated learning data in the learning data storing unit 82a. Then, the conversion learning unit 82 proceeds to step S8204. Various methods can be conceived as the method of generating the learning data based on the pitch components. For example, if an average value of the pitch components is registered, the registration is executed in formula (4). In other words, average value Ppav of the pitch components recorded in the learning data storing unit 82a by previous learning and previous learning count N may be recorded and new pitch components may be updated with pitch components Pnew of new learning.

In step S8204, the conversion learning unit 82 discriminates whether or not the input of the digital speech signal from the speech input unit 11 has been interrupted. If the input of the digital speech signal has been interrupted, the conversion learning unit 82 ends this process. If the input of the digital speech signal has not been interrupted, the conversion learning unit 81 proceeds to step S8201 to execute the process for a next frame.

Figure 27:
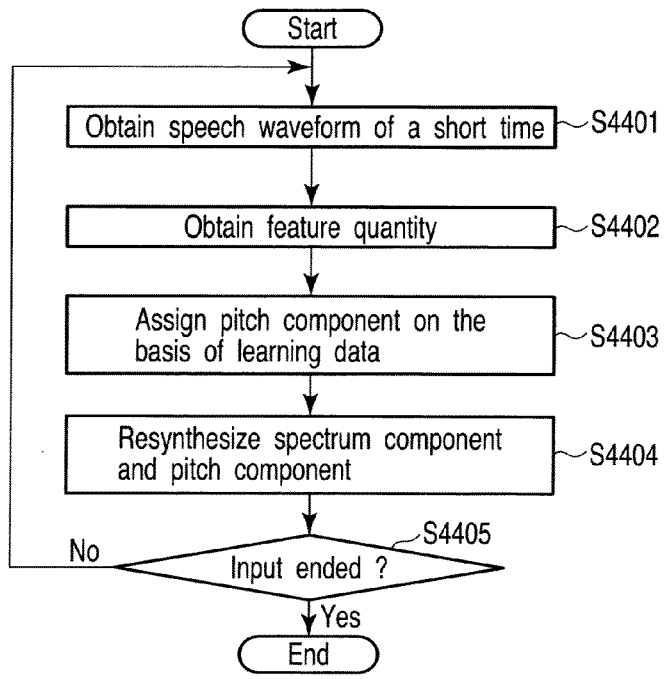
FIG. 27 shows a flowchart of operations of a speech converting unit.

Next, details of the operation of the speech converting unit 44 will be described with reference to a flowchart of FIG. 27. When the speech style is discriminated as whisper as described above, the speech converting unit 44 inputs the digital speech signal from the conversion control unit 32 as shown in FIG. 21. In this example, the input speech is converted into speech which can easily be heard by adding the pitch component to the input digital speech signal.

In S4401, the speech converting unit 44 obtains the digital speech signals in the frame in which whisper is discriminated by the speech style estimating unit 22 and the frames in predetermined sections before and after the frame, from the digital speech signal input from the conversion control unit 32, and cuts out the speech data in frame length F1 and frame shift Fs from the digital speech signals. Then, the speech converting unit 44 proceeds to step S4402. The frame length and the frame shift may be the same as those of the characteristic extracting unit 62.

In step S4402, the speech converting unit 44 obtains linear prediction (LPC) coefficient αi, predictive residual signal ri and the pitch components from the characteristic extracting unit 62. The speech converting unit 44 proceeds to step S4403.

In S4403, the speech converting unit 44 reads the speech waveform corresponding to the pitch components obtained in step S4402 from the learning data storing unit 82a, and urges a voiced source signal to be generated on the basis of the speech waveform. For example, the speech converting unit 44 generates a voiced source signal by repeatedly generating simple pulse signals in accordance with the read pitch cycle, adds the generated voiced source signal to the predictive residual signal and thereby urges a voiced source signal to be generated. Then, the speech converting unit 44 proceeds to step S4404.

In step S4404, the speech converting unit 44 synthesizes the predictive residual signal (ri) to which the pitch components are assigned in step S4403 and the linear prediction coefficient (αi) extracted as the spectrum component in step S4402 by urging them to pass through a synthesis filter. The speech converting unit 44 thereby obtains the speech data having listenability improved by assigning the pitch component. The speech converting unit 44 outputs the speech data to the speech output unit 51.

In step S4405, the speech converting unit 44 discriminates whether or not the input of the digital speech signal from the conversion control unit 32 has been interrupted. If the input of the digital speech signal has been interrupted, the speech converting unit 44 ends this process. If the input of the digital speech signal has not been interrupted, the speech converting unit 44 proceeds to step S4401 to execute a process of adding the pitch components for a next frame.

As described above, in the speech converter 257, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, since the speech converter 257 comprises the characteristic extracting unit 62 and urges the pitch components and the spectrum component extracted by the characteristic extracting unit 62 to be shared by the speech style estimating unit 22, the speech conversion unit 44 and the conversion control unit 82, the calculation amount of the entire apparatus can be restricted. Besides, the same advantage as that of the speech converter 251 in the first embodiment or the speech converter 256 in the sixth embodiment can be obtained, and the same modification can be made.

(Eighth Embodiment)

Next, a speech converter 258 shown in FIG. 28 will be described as an eighth embodiment of the speech converter 250.

In this embodiment, the speech converter is operated to input the converted speech signal to the speech encoding unit 260 via a reference signal outputting unit. Currently, various systems of encoding for a cellular telephone (mobile radio terminal) have been standardized in accordance with their generations, and standardization of new systems will be expected in future. However, they commonly employ linear prediction analysis (LPC) and line spectral pair (LSP).

Since parameters calculated by these analyses have a lot of common elements in terms of extracting the spectrum component or pitch component from the speech signal and proceed with the process, these analyses have high affinity with the feature extraction in the speech style estimation and the speech conversion. The calculation amount can be restricted by making the feature extracting processes common.

In this embodiment, a signal process common to the encoding process is entirely executed by a feature extracting unit in a case where the encoding system based on code excitation linear prediction (CELP) encoding.

Figure 28:
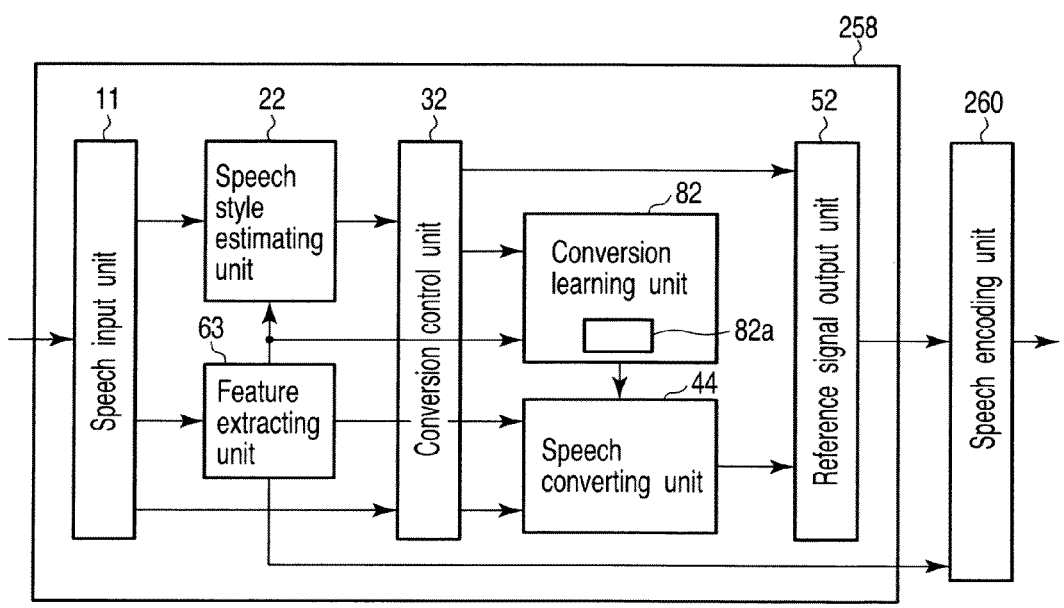
FIG. 28 shows a block diagram of a configuration of a speech converter.

As shown in FIG. 28, the speech converter 258 comprises a speech input unit 11, a speech style estimating unit 22, a conversion control unit 32, a speech converting unit 44, a reference signal outputting unit 52, a feature extracting unit 63 and a conversion learning unit 82. FIG. 28 also shows the speech encoding unit 260 shown in FIG. 2.

The speech input unit 11 accepts an input of the digital speech signal from the AD conversion unit 240 of the prior stage, and outputs the digital speech signal to the conversion control unit 32 and the feature extracting unit 63.

The feature extracting unit 63 extracts a spectrum component of the digital speech signal, and extracts a predictive residual signal ri (i=1, 2, . . . , N: N represents an analysis dimension) and pitch components (frequency Ff and strength Sf) for each frame as a feature quantity of the digital speech signal, on the basis of the linear prediction (LPC) coefficient αi which is the spectrum component.

Since the extracted pitch components are output to not only the speech style estimating unit 22, but also the converting process of the speech converting unit 44, the extracted pitch components are also output to the speech converting unit 44. Thus, duplication of the process of extracting the pitch components can be avoided and the process can be executed efficiently by sharing the pitch components by the speech style estimating unit 22, the speech converting unit 44 and the conversion learning unit 82. In addition, the predictive residual signal ri and the linear prediction coefficient αi are output to the speech converting unit 44, and the extraction of the signal can also be processed efficiently. Details of the operation of the feature extracting unit 63 will be described later.

The feature extracting unit 63 obtains a code book (quantization LSP parameter) of a quantized line spectral pair from the currently obtained linear prediction (LPC) coefficient αi, and outputs the code book and the linear prediction (LPC) coefficient αi to the speech encoding unit 260. Details of the operations of the feature extracting unit 63 will be described later.

The speech style estimating unit 22 analyzes the pitch components extracted by the feature extracting unit 63, and estimates the speech style in which the input speech has been made, on the basis of the result of analysis. The speech style estimated by the speech style estimating unit 22 is output to the conversion control unit 32. Details of the operation of the speech style estimating unit 22 are the same as those of the second embodiment described with reference to FIG. 10 and, therefore, are not described here.

The conversion control unit 32 buffers the digital speech signal input from the speech input unit 11, and selectively outputs the digital speech signal input from the speech input unit 11 to the speech output unit 52, conversion learning unit 82 or speech converting unit 44 on the basis of the speech style estimated by the speech style estimating unit 22.

Such speech conversion may not be executed by the speech converting unit 44 on the basis of the output of change according to the speech style, but the digital speech signal may be output to the speech converting unit 44 at any time and the speech converting unit 44 may dynamically change the method of speech conversion in accordance with the speech style. Details of the operation of the conversion control unit 32 are the same as those of the sixth embodiment described with reference to FIG. 21 and, therefore, are not described here.

The conversion learning unit 82 comprises a learning data storing unit 82a. When the conversion learning unit 82 inputs the digital speech signal from the conversion control unit 32 (i.e. when the speech style can be learnt as the general speech), the conversion learning unit 82 learns the pitch component output from the feature extracting unit 63 as information which is needed when the speech converting unit 43 converts the speech, and stores the learnt data in the learning data storing unit 82a. Details of the operation of the conversion learning unit 82 are the same as those of the seventh embodiment described with reference to FIG. 26 and, therefore, are not described here.

The speech converting unit 44 executes a signal process by using the pitch components and spectrum component extracted by the feature extracting unit 63 and the learning data stored in the learning data storing unit 82a such that a speech of the digital speech signal input via the conversion control unit 32 can easily be heard, converts the digital speech signal, and outputs the converted digital speech signal to the speech output unit 52. Details of the operation of the speech converting unit 44 are the same as those of the seventh embodiment described with reference to FIG. 27 and, therefore, are not described here.

The speech output unit 52 buffers the digital speech signal output from the conversion control unit 32 or the speech converting unit 44, and outputs the buffered digital speech signal to the speech encoding unit 260 of the subsequent stage. If the digital speech signal is output by changing the conversion control unit 32 to the speech converting unit 44 or the speech converting unit 44 to the conversion control unit 32, the digital speech signals are output from the units to the speech encoding unit 260 so as to be sequential.

The speech encoding unit 260 encodes a speech-converted reference signal output from the reference signal outputting unit 52 and generates encoded data, on the basis of the linear prediction coefficient and the code book of the quantized line spectral pair calculated by the feature extracting unit 63. The speech encoding unit 260 prepares a table of a fixed code book and a table of a gain code book as the same code books as the code book used on the receiver side (decoding unit). Details of the operation of the speech encoding unit 260 will be described later.

Figure 29:
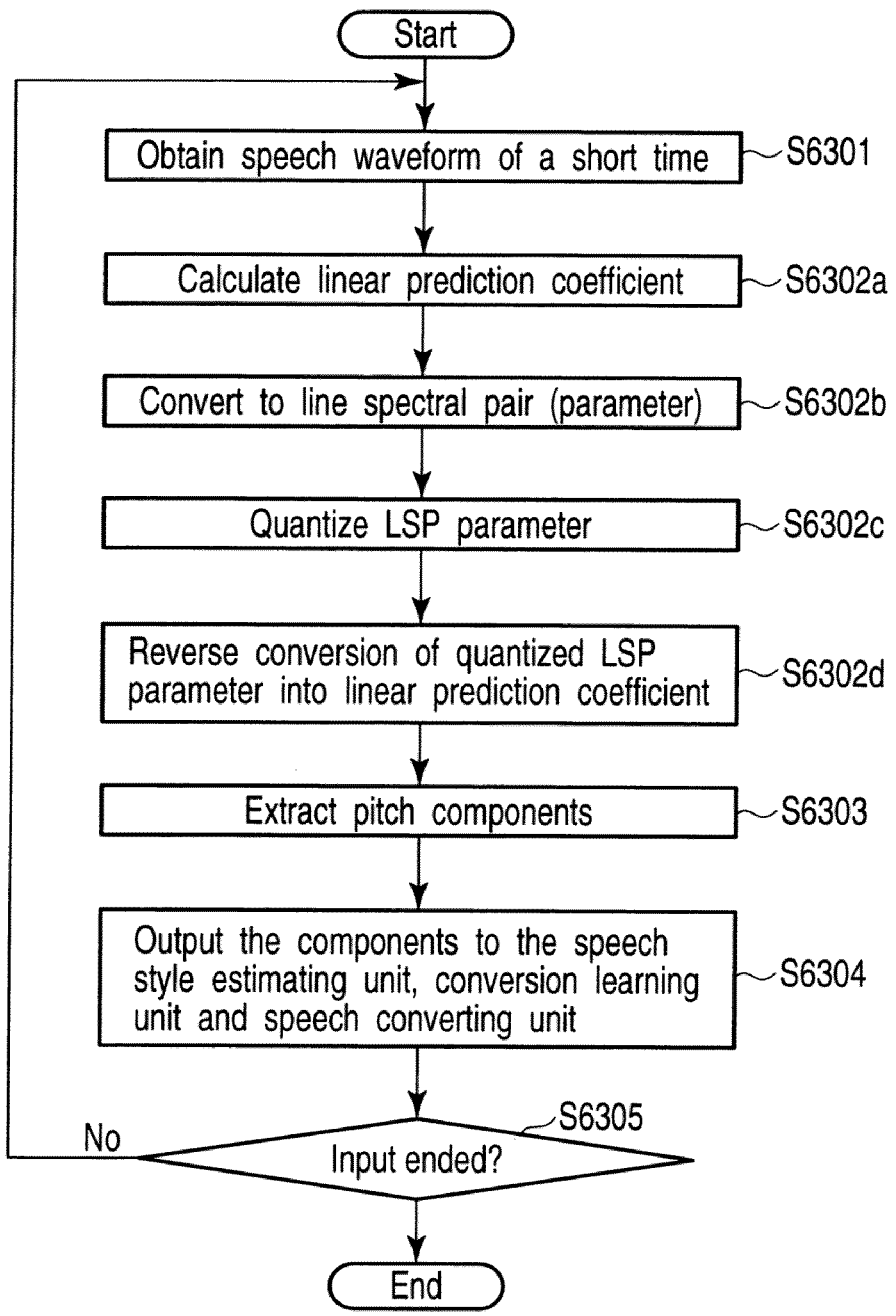
FIG. 29 shows a flowchart of operations of a feature extracting unit.

Next, the operations of the units in the speech converter 258 according to the eighth embodiment will be described in detail. First, details of the operation of the feature extracting unit 63 will be described with reference to a flowchart of FIG. 29.

First, in S6301, the feature extracting unit 63 cuts out the speech data from the digital speech signal input from the speech input unit 11, in frame length F1 and frame shift Fs. Then, the feature extracting unit 63 proceeds to step S6302a. The frame is a basic unit in the estimating process of the speech style of the speech style estimating unit 22 and the converting process of the speech converting unit 44. For example, frame length F1 can be set at 25 ms and frame shift Fs can be set at 10 ms. For this reason, the speech data cut out in each frame has a portion overlapping between adjacent frames. The frame length and the frame shift may be the same as those of the speech style estimating unit 21 of the first embodiment.

In step S6302a, the feature extracting unit 63 analyzes a speech waveform of a short time by analyzing the speech data cut out in step S6301 for each frame, and thereby extracts the spectrum component for each frame. Then, the feature extracting unit 63 proceeds to step S6302b. As the analyzing method, for example, linear prediction analysis (LPC) can be employed. The spectrum component may be expressed by extracted linear prediction coefficient $\alpha i$ ($i=1, 2, \ldots, N$: N represents an analysis dimension).

In step S6302b, the feature extracting unit 63 executes line spectral pair of the linear prediction coefficient $\alpha i$ extracted in step S6302a and obtains the LSP parameter. Then, the feature extracting unit 63 proceeds to step S6302c.

In step S6302c, the feature extracting unit 63 executes quantizes the LSP parameter by detecting the code book closest to the LSP parameter obtained in step S6302b, of the prepared LSP parameter code book. Then, the feature extracting unit 63 proceeds to step S6302d.

In step S6302d, the feature extracting unit 63 converts again the LSP parameter quantized in step S6302c into the linear prediction coefficient. Then, the feature extracting unit 63 proceeds to step S6303.

In step S6303, the feature extracting unit 63 analyzes the speech waveform of a short time by analyzing the speech data cut out in step S6301 for each frame, and thereby extracts pitch components (frequency Ff and strength Sf) of each frame. Then, the feature extracting unit 62 proceeds to step S6304. As the method of extracting the pitch components, for example, predictive residual signal ri ($i=1, 2, \ldots, N$: N represents an analysis dimension) from which the spectrum component extracted from the speech waveform in step S6302a is removed is calculated by using the quantized linear prediction coefficient $\alpha i$, and frequency Ff and strength Sf of the pitch components are obtained from an auto-correlation function of the predictive residual signal ri.

In step S6304, the feature extracting unit 63 outputs the pitch components extracted in step S6303 to the speech style estimating unit 22, the speech converting unit 44, and the conversion learning unit 82. In addition, the feature extracting unit 63 outputs the predictive residual signal ri calculated at the time of obtaining the pitch components in step S6303 to the speech converting unit 44. Furthermore, the feature extracting unit 63 outputs the linear prediction coefficient $\alpha i$ extracted in step S6302a and the LSP parameter (code book) quantized in step S6302c, to the speech encoding unit 260.

In step S6305, the feature extracting unit 63 discriminates whether or not the input of the digital speech signal from the speech input unit 11 is interrupted. If the input of the digital speech signal is interrupted, the feature extracting unit 63 ends this process. If the input of the digital speech signal is not interrupted, the feature extracting unit 63 proceeds to step S6301 to extract the spectrum component and the pitch components for a next frame.

Figure 30:
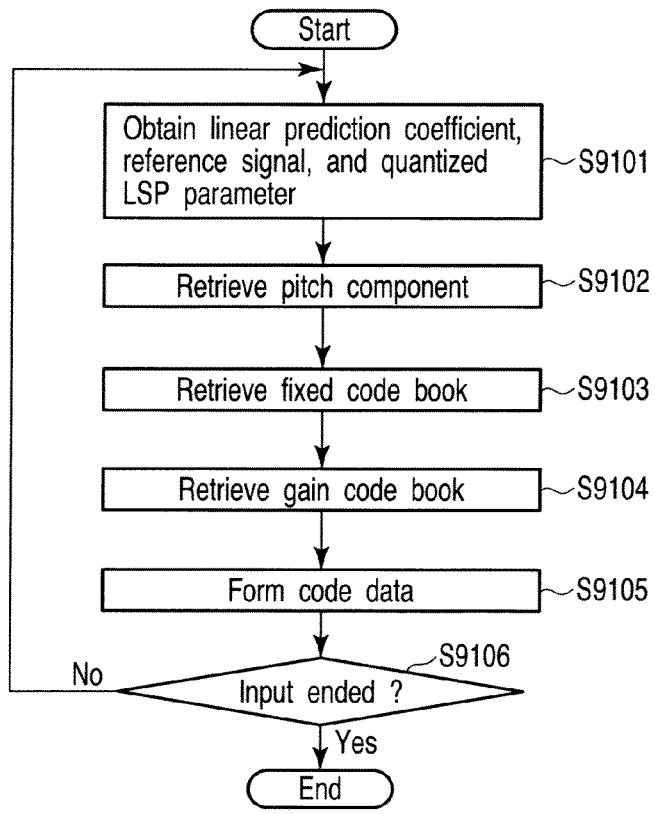
FIG. 30 shows a flowchart of operations of a speech encoding unit.

Next, details of the operation of the speech encoding unit 260 will be described with reference to a flowchart of FIG. 30.

First, in S9101, the speech encoding unit 260 obtains the quantized linear prediction coefficient and the code book of the quantized line spectral pair from the feature extracting unit 63, and obtains a reference signal from the reference signal outputting unit 52. Then, the speech encoding unit 260 proceeds to step S9102.

In step S9102, the speech encoding unit 260 executes pitch analysis by using the quantized linear prediction coefficient in terms of the reference signal, and obtains pitch cycle information. Furthermore, the speech encoding unit 260 obtains an excitation signal corresponding to an adaptable code book component. The speech encoding unit 260 proceeds to step S9103.

In step S9103, the speech encoding unit 260 retrieves the fixed code book and obtains an optimum fixed code book, on the basis of the quantized linear prediction coefficient and an excitation signal, in terms of the reference signal. In accordance with this, the speech encoding unit 260 also obtains the excitation signal corresponding to the fixed code book component, and proceeds to step S9104.

In step S9104, the speech encoding unit 260 retrieves the gain code book and obtains an optimum gain code book, on the basis of the reference signal, the quantized linear prediction coefficient and the excitation signal corresponding to the adaptable code book component. The speech encoding unit 260 proceeds to step S9105.

In step S9105, the speech encoding unit 260 packages the obtained LSP code book, the gain code book, the fixed code book, the pitch cycle information and the like as the code data, and thereby generates encoded data in which the reference signal is encoded.

In step S9106, the speech encoding unit 260 discriminates whether or not the input of the reference signal from the reference signal outputting unit 52 has been interrupted. If the input of the reference signal has been interrupted, the speech encoding unit 260 ends this process. If the input of the reference signal has not been interrupted, the speech encoding unit 260 proceeds to step S9101 to execute encoding.

As described above, in the speech converter 258, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, the speech converter 258 comprises the feature extracting unit 63 and urges the pitch components and the spectrum component extracted by the feature extracting unit 62 to be shared by the speech style estimating unit 22, the speech conversion unit 44 and the conversion control unit 82. Therefore, the calculation amount of the entire apparatus can be restricted.

Besides, the same advantage as that of the speech converter 251 in the first embodiment or the speech converter 257 in the seventh embodiment can be obtained, and the same modification can be made. The operation of the speech encoding unit 260 described in this embodiment is merely an example, and the present invention can be applied to all the standardized speech encoding systems.

(Ninth Embodiment)

Figure 31:
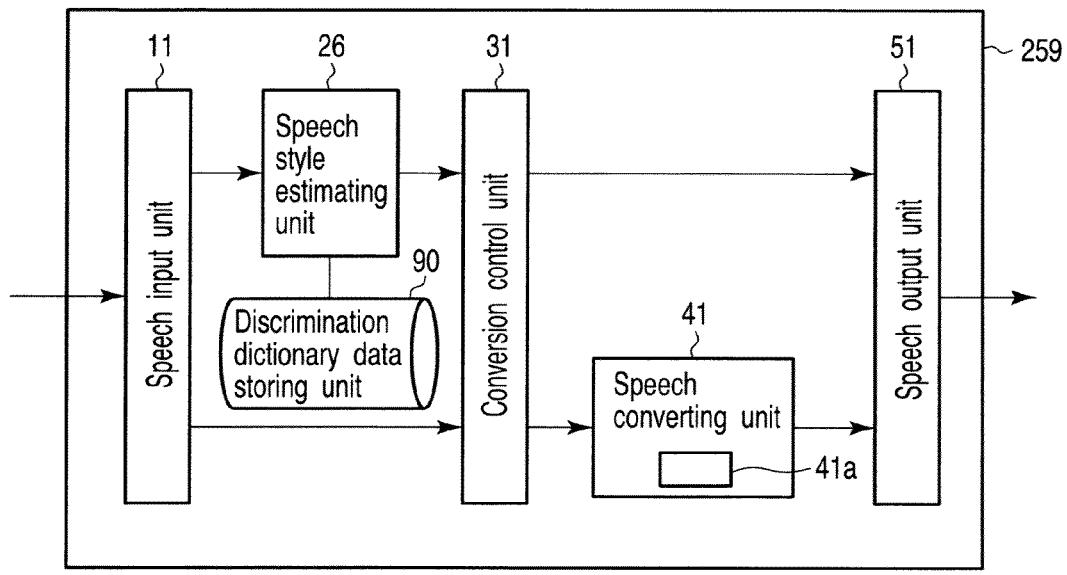
FIG. 31 shows a block diagram of a configuration of a speech converter.

Next, a speech converter 259 shown in FIG. 31 will be described as a ninth embodiment of the speech converter 250. As shown in FIG. 31, the speech converter 259 comprises a speech input unit 11, a speech style estimating unit 26, a conversion control unit 31, a speech converting unit 41, a speech output unit 51, and a discrimination dictionary data storing unit 90.

The speech input unit 11 accepts input of the digital speech signal from the AD conversion unit 240 of the prior stage, and outputs the digital speech signal to the speech style estimating unit 26 and the conversion control unit 31.

The speech style estimating unit 26 analyzes the digital speech signal input from the speech input unit 11, and estimates the speech style in which the input speech has been made, on the basis of the result of analysis, by referring to dictionary data for discrimination stored in the discrimination dictionary data storing unit 90. The speech style estimated by the speech style estimating unit 26 is output to the conversion control unit 31. Details of the operation of the speech style estimating unit 26 will be described later.

The discrimination dictionary data storing unit 90 stores the dictionary data for discrimination. Various types of the dictionary for discrimination are conceived, but probability distribution in a feature space such as a mixed Gauss distribution model can be cited as an example. The discrimination dictionary can learn by employing an existing learning algorithm such as EM algorithm using speech prepared for each speech style as a learning material. In this embodiment, the discrimination dictionary preliminarily learns models corresponding to speech styles of general speech and whisper.

The conversion control unit 31 buffers the digital speech signal input from the speech input unit 11, and determines whether the digital speech signal input from the speech input unit 11 should be output to the speech output unit 51 or the speech converting unit 41 on the basis of the speech style estimated by the speech style estimating unit 26.

Such speech conversion may not be executed by the speech converting unit 41 on the basis of the output of change according to the speech style, but the digital speech signal may be output to the speech converting unit 41 at any time and the speech converting unit 41 may dynamically change the method of speech conversion in accordance with the speech style. Details of the operation of the conversion control unit 31 are the same as those of the first embodiment described with reference to FIG. 6 and, therefore, are not described here.

The speech converting unit 41 comprises a pitch data storing unit 41a which stores pitch data. The pitch data storing unit 41a stores typical pitch components (frequency Ff and strength Sf) of the digital speech signal, and a speech waveform in association with each other. Then, the speech converting unit 41 executes a signal process by using the pitch data stored in the pitch data storing unit 41a such that a speech of the digital speech signal input via the conversion control unit 31 can easily be heard, converts the digital speech signal, and outputs the converted digital speech signal to the speech output unit 51. Details of the operation of the speech converting unit 41 are the same as those of the first embodiment described with reference to FIG. 7 and, therefore, are not described here.

The speech output unit 51 buffers the digital speech signal output from the conversion control unit 31 or the speech converting unit 41, and outputs the buffered digital speech signal to the speech encoding unit 260 of the subsequent stage. If the digital speech signal is output by changing the conversion control unit 31 to the speech converting unit 41 or the speech converting unit 41 to the conversion control unit 31, the digital speech signals are output from the units to the speech encoding unit 260 so as to be sequential.

Next, the operations of the units in the speech converter 259 according to the ninth embodiment will be described in detail. Details of the operation of the speech style estimating unit 26 will be described with reference to a flowchart of FIG. 32. The speech style estimating unit 26 processes the input digital speech signal and distinguishes a general voice and a whisper on the basis of the volume.

First, in step S2601, the speech style estimating unit 26 cuts out of the digital speech signal input from the speech input unit 11, the speech data included therein, in terms of frame length F1 and frame shift Fs. Then, the speech style estimating unit 26 proceeds to step S2602. The frame is a basic unit in the estimating process of the speech style and the converting process of the speech converting unit 41. For example, frame length F1 can be set at 25 ms and frame shift Fs can be set at 10 ms. For this reason, the speech data cut out in each frame has a portion overlapping between adjacent frames.

In step S2602, the speech style estimating unit 26 analyzes a speech waveform of a short time by analyzing the speech data cut out in step S2601 in each frame, and thereby extracts the feature of the speech data in each frame. Then, the speech style estimating unit 26 proceeds to step S2603. In this embodiment, for example, a discrimination dictionary is constructed by using mel frequency cepstral coefficient (MFCC) often employed for speech recognition as the feature quantity.

For this reason, the speech style estimating unit 26 extracts the power spectrum from the speech waveform included in the frame by Fast Fourier Transform (FFT), and urges each spectrum component to pass through a bandpass filter of a mel band designed in accordance with the aural characteristic. Then, the speech style estimating unit 26 converts the component passing through the bandpass filter into a logarithm and then converts the logarithm into a cepstral coefficient by inverse Fourier Transform. The speech style estimating unit 26 thereby calculates feature quantity m for each frame. m represents the number of dimensions of the feature quantity. For example, thirteen dimensions, twenty-six dimensions including a first differential coefficient thereof, and the like are employed.

In step S2603, the speech style estimating unit 26 stores the feature quantity in frame unit calculated in step S2602 in a buffer. Then, the speech style estimating unit 26 proceeds to step S2604. The buffer is provided in the speech style estimating unit 26 and is capable of storing the feature quantity in a plurality of frames corresponding to, for example, no less than 1 second. By comprising the buffer, the speech style estimating unit 26 can discriminate the speech style from the power components of a plurality of frames, and can discriminate the speech style more stably than the discrimination from the power component of one frame. In step S2603, too, the speech style estimating unit 26 overwrites the memory area such that only new feature quantity needed for discrimination of the subsequent stage remains, to efficiently use the memory area of the buffer.

In step S2604, the speech style estimating unit 26 discriminates whether the feature quantity of a section length (for example, 1 second) needed for discrimination is stored in the buffer. For example, if the leading section of the digital speech signal is processed, the feature quantity of a sufficient section length is not stored in the buffer and, therefore, the speech style estimating unit 26 proceeds to step S2601 to obtain the speech waveform of a next frame. If the feature quantity of a sufficient section length is stored in the buffer, the speech style estimating unit 26 proceeds to step S2605.

In step S2605, the speech style estimating unit 26 obtains representative feature quantity Xt of section length t. For example, the speech style estimating unit 26 obtains the representative feature quantity X from an average power represented in formula (1). The speech style estimating unit 26 compares the representative feature quantity Xt with the dictionary data for discrimination stored in the discrimination dictionary data storing unit 90 and calculates likelihood for each speech style. For example, the likelihood can be obtained by prestoring the average vector and the dispersing vector of each speech style in the feature quantity space as the dictionary for discrimination and dynamically obtaining the input feature quantity and the distance of the average vector (where the distance measure is Euclidean distance, probability of normal distribution, or the like).

If the normal distribution of one mixture is considered as the model for discrimination, average vector μy of the normal distribution and diagonal covariance matrix Σy (where y represents the type of the speech style with the same dimension number as that of the feature quantity) for each speech style are defined as model parameters. In this case, likelihood Ly can be obtained below in formula (5).

$$L_y = \frac{1}{\sqrt{2\pi|\Sigma_y|}} \exp\left(-\frac{(m-\mu_y)^2}{2|\Sigma_y|}\right) \quad (5)$$

In step S2606, the speech style estimating unit 26 compares the likelihood obtained in step S2606 with a prestored average likelihood of each speech style and estimates the speech style corresponding to the closest likelihood as the speech style of this section. Then the speech style estimating unit 26 proceeds to step S2607.

In step S2607, the speech style estimating unit 26 notifies the conversion control unit 31 of the speech style obtained by the discrimination in step S2606. Then, the speech style estimating unit 26 proceeds to step S2608.

In step S2608, the speech style estimating unit 26 discriminates whether or not the input of the digital speech signal from the speech input unit 11 has been interrupted. If the input has been interrupted, the speech style estimating unit 26 ends the process. If the input has not been interrupted, the speech style estimating unit 26 proceeds to step S2601 to execute a process for a next frame.

As described above, the speech style estimating unit 26 repeats the estimation of the speech style in frame unit, and stops the process if the input of the digital speech signal is interrupted or restarts the process if the input is executed again.

As described above, in the speech converter 259, the speech style of the input speech is detected, it is automatically discriminated whether or not the speech input on the basis of the detected speech style can hardly be heard at the time of outputting the speech and, if the speech can hardly be heard, the pitch components are added to the speech such that the speech is converted into speech which can easily be heard.

Therefore, even if the user changes the speech style in accordance with change in speaking environment, the speech conversion is automatically executed as needed without special operations, and the speech which can easily be heard is output at the reproduction. For this reason, for example, even if the user suddenly speaks with whisper or changes whisper to the general speech style during conversation using the cellular telephone, the user can seamlessly continue speaking without giving an uncomfortable feeling to the conversation partner.

In addition, in the speech converter 259, the dictionary for discrimination is preliminarily constructed from the speech of each speech style, and the speech style is estimated by comparing this dictionary with the speech in the feature space. By preliminarily preparing the distribution of the feature space from a number of data elements, a more stable discrimination result than that of the other methods can be obtained. Besides, the same advantage as that of the speech converter 251 in the first embodiment can be obtained.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the speech converters 251-259 according to the present invention are applied to the transmission system of the mobile radio terminal in the above-described embodiments. However, the speech converters 251-259 may be applied to the reception system (for example, between the speech decoder 200 and the DA converter 210).

In addition, each of the speech converters 251-259 may be implemented by DSP (Digital Signal Processor). Furthermore, the configuration of each of the speech converters 251-259 may be implemented by CPU (Central Processing Unit) and a memory. In this case, a control program for operating the CPU as any one of the speech converters 251-259 is stored in the memory, and the CPU operates as any one of the speech converters 251-259 when the CPU operates under the control program.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal, comprising:
   a speech input unit which inputs a speech signal obtained from speech of a speaking person;
   an accepting unit which accepts setting of an operation mode;
   a first detecting unit which detects a feature quantity indicating a speech feature from the speech signal;
   an estimating unit which estimates a speech style of the speaking person from the speech signal in accordance with the set operation mode and the feature quantity, the speech style including whispering, general voice, high speaking speed, and low speaking speed; and
   a converting unit which converts the speech signal into a converted speech signal in accordance with the estimated speech style.

2. The terminal according to claim 1, wherein the estimating unit comprises a style estimating unit which estimates the speech style in accordance with the feature quantity.

3. The terminal according to claim 2, wherein the converting unit converts the speech signal into the converted speech signal in accordance with the feature quantity detected by the first detecting unit.

4. The terminal according to claim 2, further comprising an encoding unit which encodes the converted speech signal converted by the converting unit, in accordance with the feature quantity detected by the first detecting unit.

5. The terminal according to claim 1, wherein the estimating unit comprises:
   a second detecting unit which detects a signal intensity from the speech signal; and
   a style estimating unit which estimates the speech style in accordance with the signal intensity.

6. The terminal according to claim 1, wherein the estimating unit comprises:
   a third detecting unit which detects an intensity of a pitch component from the speech signal; and
   a style estimating unit which estimates the speech style in accordance with the intensity of the pitch component.

7. The terminal according to claim 1, wherein the estimating unit comprises:
   a fourth detecting unit which detects each of intensities of spectrum components in two frequency bands from the speech signal; and
   a style estimating unit which estimates the speech style in accordance with a difference between the intensities of the spectrum components in the two frequency bands.

8. The terminal according to claim 1, wherein the estimating unit comprises:
   a storing unit which stores dictionary data preliminarily associating a feature quantity with a speech style; and
   a style estimating unit which estimates the speech style in accordance with the detected feature quantity, by referring to the dictionary data.

9. The terminal according to claim 1, wherein the estimating unit, if the estimated speech style is not a preset speech style, estimates the speech style in accordance with the feature quantity.

10. The terminal according to claim 1, wherein the converting unit executes a conversion by adding a pitch component to the speech signal.

11. The terminal according to claim 1, wherein the converting unit comprises:
    a storing unit which stores the feature quantity and conversion data in association with each other; and
    a speech converting unit which converts the speech signal into the converted speech signal by using the conversion data corresponding to the detected feature quantity.

12. The terminal according to claim 11, further comprising an encoding unit which encodes the converted speech signal by using the detected feature quantity.

13. The terminal according to claim 11, further comprising:
    a learning detecting unit which detects the feature quantity indicating the speech feature from the speech signal;
    a generating unit which generates the conversion data in accordance with the feature quantity detected by the learning detecting unit; and
    a recording unit which records the feature quantity detected by the learning detecting unit and the conversion data generated by the generating unit, in association with each other, in the storing unit.

14. The terminal according to claim 13, further comprising an encoding unit which encodes the converted speech signal by using the feature quantity detected by the learning detecting unit.

15. The terminal according to claim 13, wherein the estimating unit estimates the speech style in accordance with the feature quantity detected by the learning detecting unit.

16. The terminal according to claim 13, wherein the learning detecting unit is the detecting unit.

17. The terminal according to claim 13, wherein if the speech style estimated by the estimating unit is a preset speech style, the recording unit records the feature quantity detected by the learning detecting unit and the conversion data generated by the generating unit, in association with each other, in the storing unit.

18. A method of converting speech, comprising:
   inputting a speech signal obtained from speech of a speaking person;
   accepting setting of an operation mode;
   detecting a feature quantity indicating a speech feature from the speech signal;
   estimating a speech style of a speaking person from the speech signal in accordance with the set operation mode and the feature quantity, the speech style including whispering, general voice, high speaking speed, and low speaking speed; and
   converting the speech signal into a converted speech signal in accordance with the estimated speech style, by using a processing unit.

19. A computer readable, non-transitory, storage medium storing instructions of a computer program which when executed by a computer results in a performance of steps comprising:
   inputting a speech signal obtained from speech of a speaking person;
   accepting setting of an operation mode;
   detecting a feature quantity indicating a speech feature from the speech signal;
   estimating a speech style of a speaking person from the speech signal in accordance with the set operation mode and the feature quantity, the speech style including whispering, general voice, high speaking speed, and low speaking speed; and
   converting the speech signal into a converted speech signal in accordance with the estimated speech style.

* * * * *